(12) United States Patent
Watanabe

(10) Patent No.: US 11,372,741 B2
(45) Date of Patent: Jun. 28, 2022

(54) INFORMATION PROCESSING APPARATUS CONFIGURED TO PERFORM DEBUG ANALYSIS BASED ON A DISTRIBUTED REPRESENTATION VECTOR FOR LINES OF A DEBUG LOG, METHOD, AND NON-TRANSITORY RECORDING MEDIUM

(71) Applicant: Genki Watanabe, Tokyo (JP)

(72) Inventor: Genki Watanabe, Tokyo (JP)

(73) Assignee: Ricoh Company, LTD., Tokyo (JP)

( * ) Notice: Subject to any disclaimer, the term of this patent is extended or adjusted under 35 U.S.C. 154(b) by 0 days.

(21) Appl. No.: 17/016,852

(22) Filed: Sep. 10, 2020

(65) Prior Publication Data

US 2021/0109838 A1 Apr. 15, 2021

(30) Foreign Application Priority Data

Oct. 9, 2019 (JP) .............................. JP2019-186306

(51) Int. Cl.
| | | |
|---|---|---|
| *G06F 11/00* | (2006.01) | |
| *G06F 11/34* | (2006.01) | |
| *G06F 11/07* | (2006.01) | |
| *G06F 11/36* | (2006.01) | |

(52) U.S. Cl.
CPC ........ *G06F 11/3476* (2013.01); *G06F 11/008* (2013.01); *G06F 11/0775* (2013.01); *G06F 11/362* (2013.01)

(58) Field of Classification Search
CPC .. G06F 11/0775; G06F 11/362; G06F 11/008; G06F 11/3476
See application file for complete search history.

(56) References Cited

U.S. PATENT DOCUMENTS

| | | | |
|---|---|---|---|
| 10,884,842 B1* | 1/2021 | Ramachandran Vijayalekshmi .... | G06F 11/079 |
| 11,194,692 B2* | 12/2021 | Xu ........................ | G06K 9/6232 |
| 2003/0051232 A1* | 3/2003 | Lam ...................... | G06F 11/362 717/131 |
| 2009/0037774 A1* | 2/2009 | Rideout ................ | G06F 11/362 714/38.1 |
| 2010/0241905 A1* | 9/2010 | Avritzer .............. | G06F 11/1438 714/48 |
| 2016/0292592 A1* | 10/2016 | Patthak ................ | G06F 11/3086 |
| 2017/0019541 A1 | 1/2017 | Hyo | |
| 2018/0150742 A1* | 5/2018 | Woulfe ................. | G06N 20/00 |
| 2019/0065343 A1* | 2/2019 | Li ........................ | G06F 11/0766 |
| 2019/0095417 A1* | 3/2019 | Xu ....................... | G06F 11/3447 |

(Continued)

FOREIGN PATENT DOCUMENTS

| | | |
|---|---|---|
| JP | 2015-164005 | 9/2015 |
| JP | 2017-027124 | 2/2017 |

OTHER PUBLICATIONS

Appendix 1 to the Oct. 2019 Update: Subject Matter Eligibility, pp. 1-41 (Year: 2019).*

*Primary Examiner* — Jonathan D Gibson
(74) *Attorney, Agent, or Firm* — Harness, Dickey & Pierce, PLC

(57) ABSTRACT

An information processing apparatus, a method, and a non-transitory recording medium. The information processing apparatus includes circuitry to acquire an operation log of a target device, generate a first vector of a distributed representation indicating the operation log, and calculate the first vector and a vector of a distributed representation based on another operation log to identify the first vector.

17 Claims, 23 Drawing Sheets

(56) References Cited

U.S. PATENT DOCUMENTS

| | | | | |
|---|---|---|---|---|
| 2019/0332769 A1* | 10/2019 | Fralick | ................. | G06F 21/566 |
| 2020/0065220 A1* | 2/2020 | Sobran | ................. | G06F 11/362 |
| 2020/0073741 A1* | 3/2020 | Wang | ................. | G06F 11/3409 |
| 2020/0322703 A1* | 10/2020 | Bures | ..................... | G06N 20/00 |
| 2021/0073204 A1* | 3/2021 | Liang | ................. | G06F 11/0793 |
| 2021/0103488 A1* | 4/2021 | Wang | ................. | G06F 11/0751 |
| 2021/0103511 A1* | 4/2021 | Wang | ................. | G06F 11/0709 |

* cited by examiner

FIG. 4

```
pwr     PowerModeRes by xCS:9
pwr       =>REJECT by Apl:26 xCS:0
job  >  ScsJobStart() JobId 302 Unit 3
job     Send_to_Apli 3 JobListInfoChange_Reason 5
job     Send_to_Apli 6 JobListInfoChange_Reason 5
job     Send_to_Apli 7 JobListInfoChange_Reason 5
job     Send_to_Apli 17 JobListInfoChange_Reason 5
```

FIG. 5A

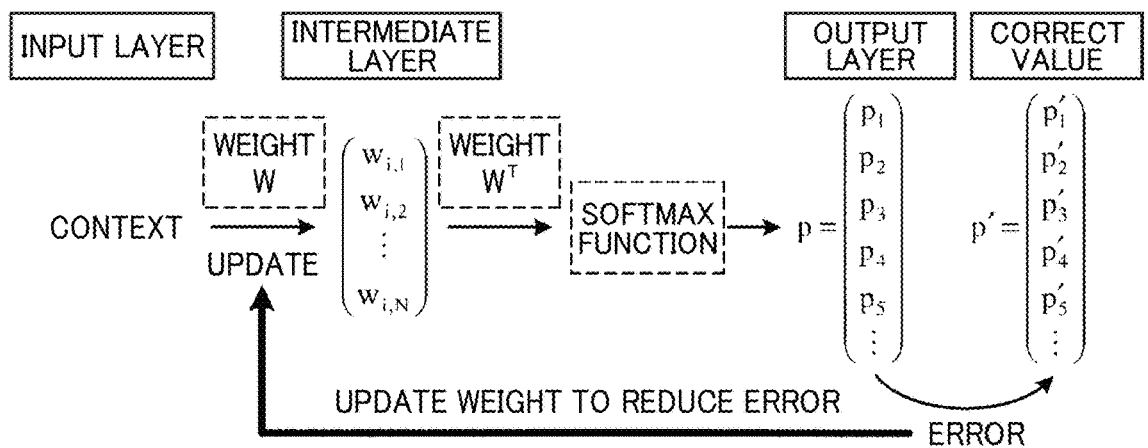

FIG. 5B $$W^T = \begin{pmatrix} w_1^T \\ w_2^T \\ \vdots \\ w_i^T \\ \vdots \\ w_S^T \end{pmatrix} = \begin{pmatrix} w_{1,1} & w_{2,1} & \cdots & w_{N,1} \\ w_{1,2} & w_{2,2} & \cdots & w_{N,2} \\ \vdots & \vdots & & \vdots \\ w_{1,i} & w_{2,i} & \cdots & w_{N,i} \\ \vdots & \vdots & & \vdots \\ w_{1,S} & w_{2,S} & \cdots & w_{N,S} \end{pmatrix}$$

FIG. 5C $$D = \begin{pmatrix} d_1 & d_2 & \cdots & d_i & \cdots & d_U \end{pmatrix}$$

$$= \begin{pmatrix} d_{1,1} & d_{1,2} & \cdots & d_{1,i} & \cdots & d_{1,U} \\ d_{2,1} & d_{2,2} & \cdots & d_{2,i} & \cdots & d_{2,U} \\ \vdots & \vdots & & \vdots & & \vdots \\ d_{N,1} & d_{N,S} & \cdots & d_{N,i} & \cdots & d_{N,U} \end{pmatrix}$$

FIG. 6

Debug Log Division Settings — 1000

- Log Division
  - ● On  ○ Off

- Log Division Method
  - ☑ Number of Lines
  - ☐ Time
  - ☐ Number of Modules — [Priority Setting Button]
  - ☑ Number of Threads — [Priority Setting Button]
  - ☐ Number of Functions — [Priority Setting Button]   ⎬ 1001
  - ☐ Number of Files — [Priority Setting Button]
  - ☐ Log Histogram Matching — [Priority Setting Button]

- Log Division Upper Limit and Lower Limit
  - ● On  ○ Off

Upper Limit: [ 3 ▼ ] ~1002
  Lower Limit: [ 1 ▼ ] ~1003

[ Register as New Log Division Method ] ~1004

[ Enter ]   [ Cancel ]
  1011        1012

FIG. 7

Debug Log Integration Settings — 1100

■ Log Integration Within Module
- ● On   ○ Off

■ Integration Method of Log within Module
- ☑ Number of Lines
- ☐ Time
- ☐ Number of Modules — Priority Setting Button
- ☑ Number of Threads — Priority Setting Button
- ☐ Number of Functions — Priority Setting Button — 1001
- ☐ Number of Files — Priority Setting Button
- ☐ Log Histogram Matching — Priority Setting Button ■ Log Integration Between Modules
- ● On   ○ Off

[Register as New Log Integration Method] — 1102

[Enter] — 1111   [Cancel] — 1112

FIG. 8

| Debug Log Threshold Settings | | 1200 |

■ Threshold Settings

● On   ○ Off

Primary Determination Threshold: [ 7 ▼ ]～1201

Secondary Determination Threshold: [ 5 ▼ ]～1202

Priority Determination Threshold: [ 9 ▼ ]～1203

※ Set the value from 0 to 10.
0 is the lowest threshold and 10 is the highest threshold

[ Enter ]   [ Cancel ]
  1211        1212

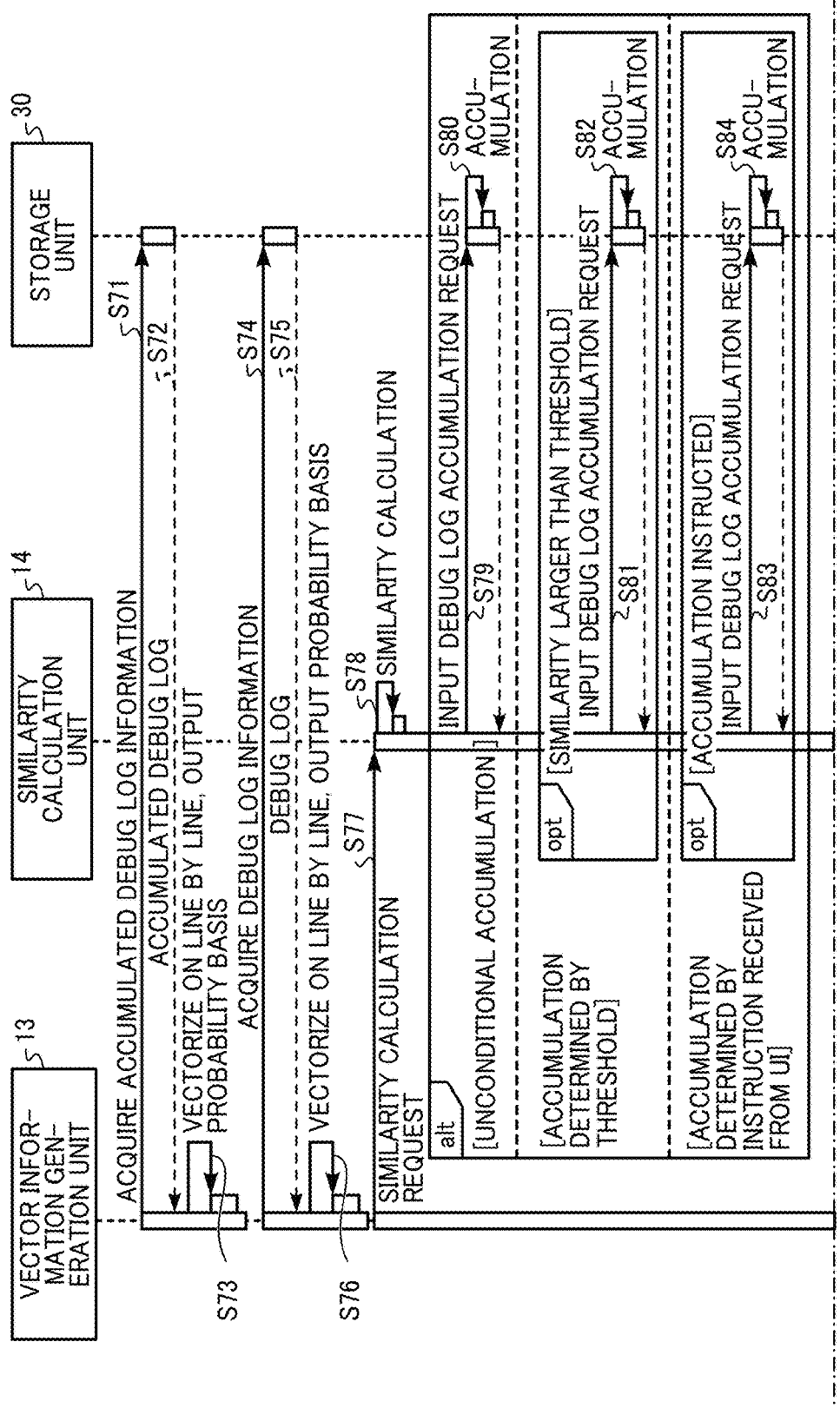

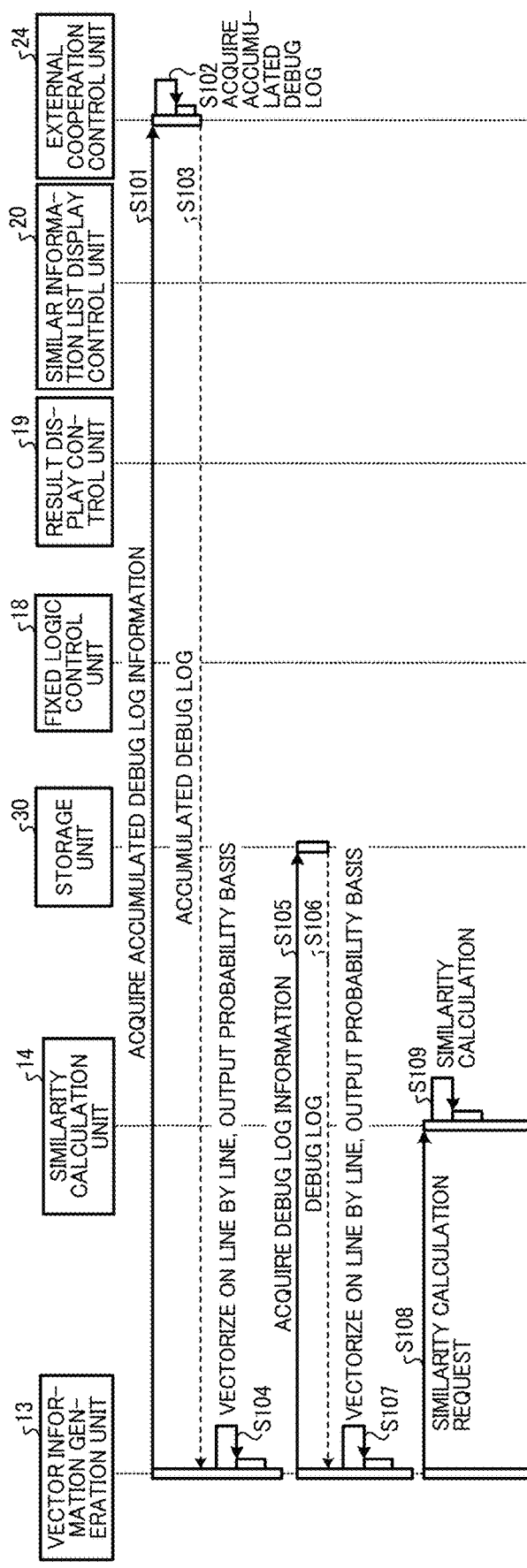

INFORMATION PROCESSING APPARATUS CONFIGURED TO PERFORM DEBUG ANALYSIS BASED ON A DISTRIBUTED REPRESENTATION VECTOR FOR LINES OF A DEBUG LOG, METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2019-186306, filed on Oct. 9, 2019, in the Japan Patent Office, the entire disclosure of which is hereby incorporated by reference herein.

BACKGROUND

Technical Field

The present disclosure relates to an information processing apparatus, a method, and a non-transitory recording medium.

Background Art

A technique to automatically identify the operation log (hereinafter referred to as debug log) logged for debugging, etc., for the purpose of failure prediction and malfunction analysis of devices such as machine tools has been known. In most of the conventional automatic identification methods for debug logs, a specific value or number of times is extracted from the debug log and vectorized, and identification is performed based on the similarity between the vectors.

As a technique for automatically identifying a defect in such a device to be monitored, a configuration is disclosed in which a specific value or the number of times is extracted from a log, vectorized, and identified based on the similarity between the vectors.

SUMMARY

The embodiments of the present disclosure describe an information processing apparatus, a method, and a non-transitory recording medium. The information processing apparatus includes circuitry to acquire an operation log of a target device, generate a first vector of a distributed representation indicating the operation log, and calculate the first vector and a vector of a distributed representation based on another operation log to identify the first vector.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 4 is a diagram illustrating an example of a debug log;

FIGS. 5A, 5B, and 5C are diagrams illustrating an operation of obtaining a distributed representation vector of the debug log;

FIG. 6 is a diagram illustrating an example of a debug log division setting screen;

FIG. 7 is a diagram illustrating an example of a debug log integration setting screen;

FIG. 8 is a diagram illustrating an example of a debug log threshold setting screen;

FIGS. 12A and 12B are sequence diagrams illustrating an example of the debug log similarity calculation process involving information accumulation in the information processing apparatus according to embodiments of the present disclosure;

FIGS. 13A and 13B are sequence diagrams illustrating an example of the debug log similarity calculation process involving external cooperation in the information processing apparatus according to embodiments of the present disclosure;

Figure 1:
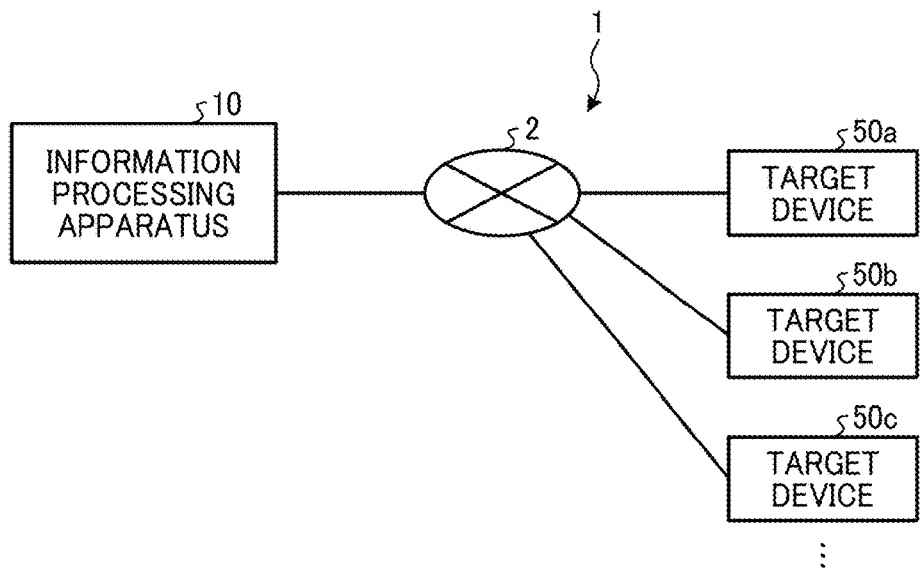
FIG. 1 is a diagram illustrating an example of a configuration of a malfunction monitoring system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a", "an", and "the" are intended to include the plural forms as well, unless the context clearly indicates otherwise.

Hereinafter, embodiments of an information processing apparatus, method, and a non-transitory recording medium according to the present disclosure is described in detail with reference to the drawings. The present disclosure, however, is not limited to the following embodiment, and the constituent elements of the following embodiment include elements that can be easily conceived by those skilled in the art, those being substantially the same ones, and those being within equivalent ranges. Furthermore, various omissions, substitutions, changes and combinations of the constituent elements can be made without departing from the gist of the following embodiments.

FIG. 1 is a diagram illustrating an example of a configuration of a malfunction monitoring system according to the present embodiment. The overall configuration of the malfunction monitoring system 1 according to the present embodiment is described with reference to FIG. 1.

As illustrated in FIG. 1, the malfunction monitoring system 1 includes an information processing apparatus 10 and target devices 50a to 50c. The information processing apparatus 10 and the target devices 50a to 50c communicate with each other through the network 2. The network 2 includes, for example, a local area network (LAN), a dedicated line, the internet, and the like, and may include a portion where wireless communication is performed in addition to wired communication.

The information processing apparatus 10 is an apparatus that performs automatic identification for failure prediction and malfunction analysis using a debug log acquired from the target devices 50a to 50c that are targets of malfunction monitoring.

The target devices 50a to 50c are devices to be monitored by the information processing apparatus 10 such as machine tools. The target devices 50a to 50c generate an operation log (debug log) indicating the operation content for each internal function or module that operates. Although the target devices 50a to 50c are included in the malfunction monitoring system 1 illustrated in FIG. 1, when any target device among the target devices 50a to 50c is indicated or collectively referred to, the target device is simply referred to as "target device 50". Further, in the malfunction monitoring system 1 illustrated in FIG. 1, three target devices 50a to 50c are included, but the number is not limited to three, and any other number may be used.

Figure 2:
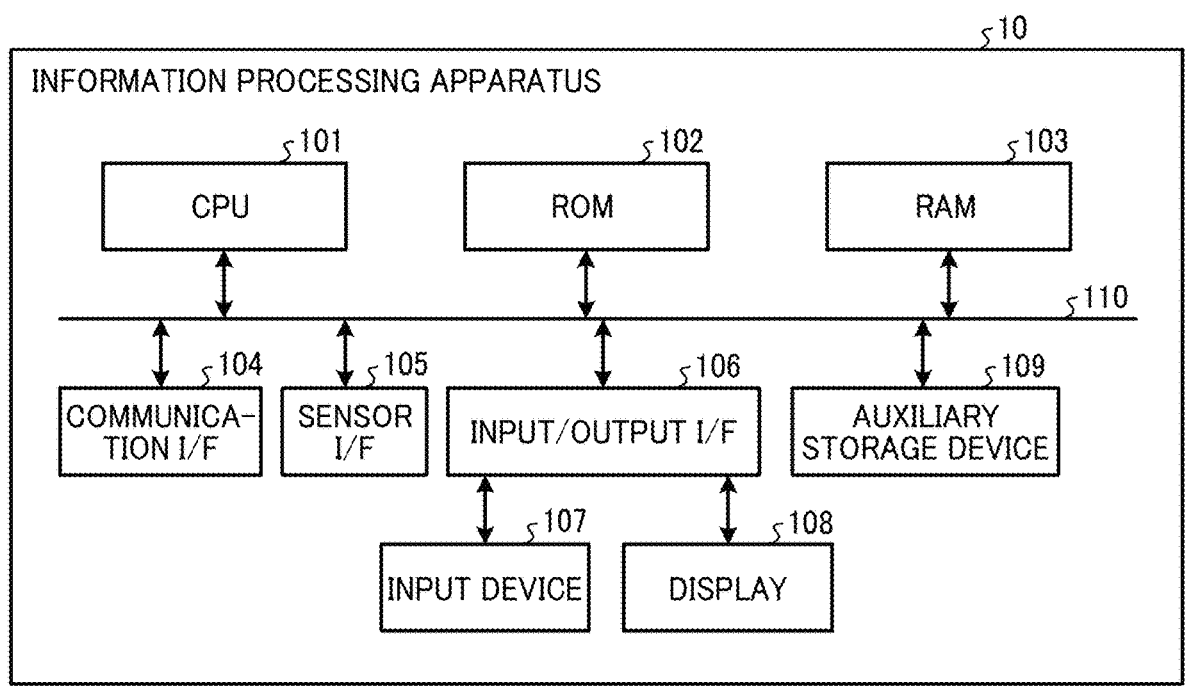
FIG. 2 is a block diagram illustrating an example of a hardware configuration of an information processing apparatus according to embodiments of the present disclosure.

FIG. 2 is a block diagram illustrating an example of a hardware configuration of an information processing apparatus according to the present embodiment. The hardware configuration of the information processing apparatus 10 according to the present embodiment is described with reference to FIG. 2.

As illustrated in FIG. 2, the information processing apparatus 10 includes a central processing unit (CPU) 101, a read only memory (ROM) 102, a random access memory (RAM) 103, a communication interface (I/F) 104, a sensor I/F 105, an input/output I/F 106, an input device 107, a display 108, and an auxiliary storage device 109. Of these elements, the CPU 101, the ROM 102, the RAM 103, the communication I/F 104, the sensor I/F 105, the input/output I/F 106, and the auxiliary storage device 109 are communicably connected by a bus 110.

The CPU 101 is a processor that controls an entire operation of the information processing apparatus 10. The CPU 101 executes the program stored in the ROM 102 or the like, using the RAM 103 as a work area, for example, to control the overall operation of the information processing apparatus 10 and implement a diagnostic function.

The communication I/F 104 is an interface for communicating with an external device such as the target device 50. The communication I/F 104 is, for example, an interface compliant with Ethernet (registered trademark) and Transmission Control Protocol/Internet Protocol (TCP/IP). The communication I/F 104 may be a wireless communication interface instead of a wired communication interface.

The sensor I/F 105 is an interface for receiving sensor data (for example, vibration data, acoustic data, temperature data, etc.) from various sensors installed in the target device 50. Note that the sensor data is not limited to being acquired by the sensor I/F 105 directly from various sensors installed in the target device 50, but the sensor data of various sensors may be acquired and accumulated by the target device 50, and the information processing apparatus 10 may acquire sensor data from the target device 50 through the communication I/F 104.

The input/output I/F 106 is an interface for connecting various devices (for example, the input device 107 and the display 108) and the bus 110.

The input device 107 is a device such as a mouse or keyboard for inputting characters and numbers, selecting various instructions, and performing operations such as moving a cursor. The input device 107 may be implemented by, for example, an input function (touch operation function) of a touch panel.

The display 108 is a display device such as a liquid crystal display (LCD) or an organic electro-luminescence (EL)

display that displays various information such as a cursor, a menu, a window, characters or images.

The auxiliary storage device 109 is a non-volatile storage device such as a hard disk drive (HDD), a solid state drive (SSD), electrically erasable programmable read-only memory (EEPROM) and the like that store settings information of the information processing apparatus 10, debug logs and sensor data received from the target device 50, operating system (OS), and various data such as application programs.

Note that the hardware configuration of the information processing apparatus 10 illustrated in FIG. 2 is an example and may not include all the components illustrated in FIG. 2 or may include other components.

Figure 3:
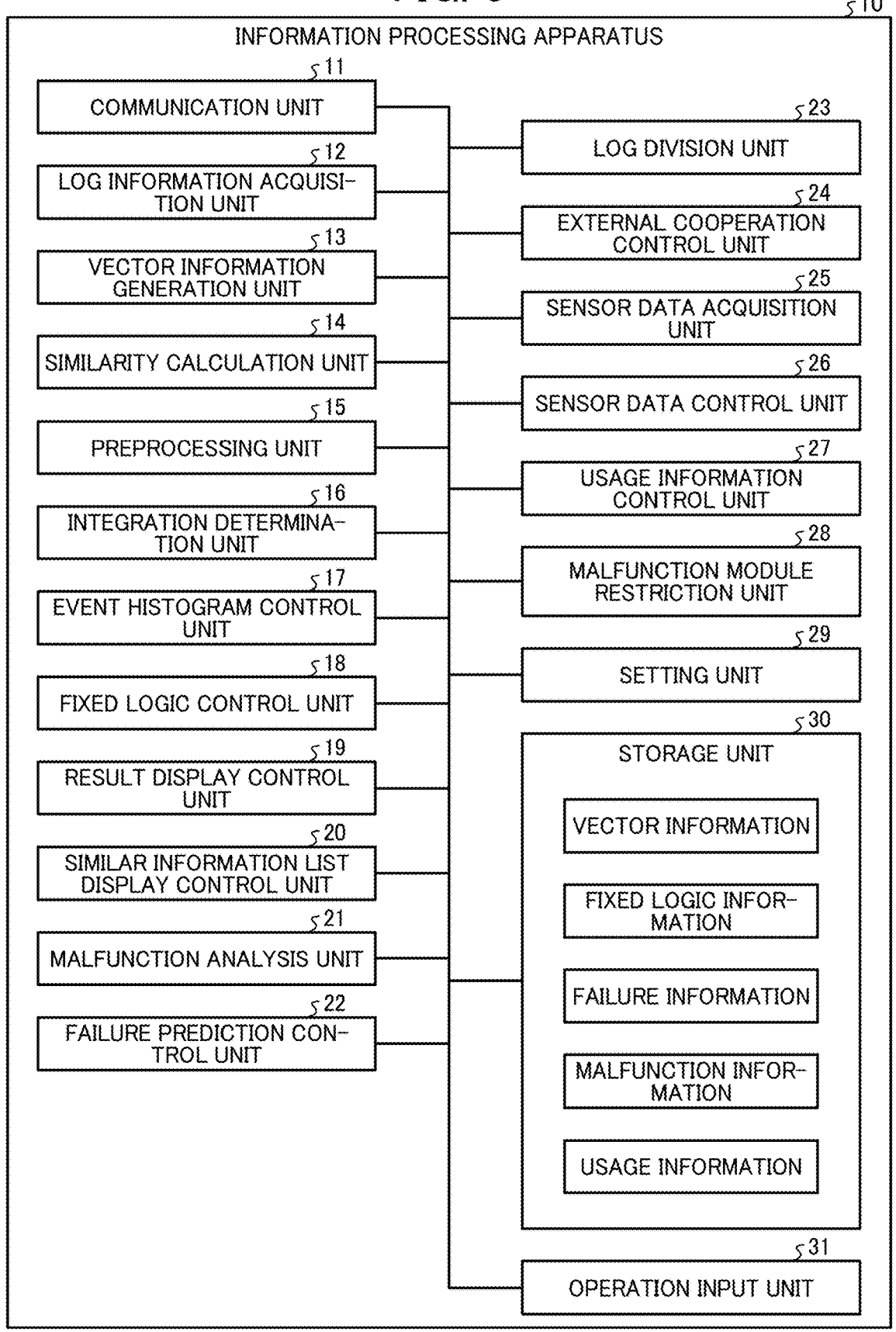
FIG. 3 is a diagram illustrating an example of a functional configuration of the information processing apparatus according to embodiments of the present disclosure.

FIG. 3 is a diagram illustrating an example of a functional configuration of the information processing apparatus according to the present embodiment. FIG. 4 is a diagram illustrating an example of a debug log. FIGS. 5A, 5B, and 5C are diagrams illustrating an operation of obtaining a distributed representation vector of the debug log. FIG. 6 is a diagram illustrating an example of a debug log division setting screen. FIG. 7 is a diagram illustrating an example of a debug log integration setting screen. FIG. 8 is a diagram illustrating an example of a debug log threshold setting screen. The configuration and operation of the functional blocks of the information processing apparatus 10 according to the present embodiment is described with reference to FIGS. 3 to 8.

As illustrated in FIG. 3, the information processing apparatus 10 includes a communication unit 11, a log information acquisition unit 12 (acquisition unit), a vector information generation unit 13 (generation unit), a similarity calculation unit 14 (calculation unit), a preprocessing unit 15, an integration determination unit 16, an event histogram control unit 17, a fixed logic control unit 18 (logic control unit), a result display control unit 19, a similar information list display control unit 20, and a malfunction analysis unit 21, failure prediction control unit 22, a log division unit 23 (division unit), an external cooperation control unit 24, a sensor data acquisition unit 25, a sensor data control unit 26, a usage information control unit 27, a malfunction module restriction unit 28 (restriction unit), a setting unit 29, a storage unit 30, and an operation input unit 31.

The communication unit 11 performs data communication with the target device 50. For example, the communication unit 11 receives a debug log, which is an operation log recorded for debugging, from the target device 50 through the network 2. The communication unit 11 is implemented by the communication I/F 104 illustrated in FIG. 2.

The log information acquisition unit 12 acquires a debug log from the target device 50 through the communication unit 11. FIG. 4 is a diagram illustrating an example of a debug log. As illustrated in FIG. 4, the debug log includes a character string, and the number of lines to be output differs depending on the module of the target device 50 and the function implemented by the software. The debug log illustrated in FIG. 4 includes seven lines, but in reality, the identification target may be in the unit of several thousands to several tens of thousands of lines. The log information acquisition unit 12 is implemented, for example, by executing a program by the CPU 101 illustrated in FIG. 2.

The vector information generation unit 13 vectorizes one line of the debug log with a distributed representation based on a probabilistic model of a line in the debug log that is a target of similarity identification and lines in the vicinity thereof. Hereinafter, the vector expressed in a distributed manner may be referred to as a "distributed representation vector".

For example, a word2vec method as illustrated in FIG. 5A may be applied as a method of vectorizing with a distributed representation. When the number of lines of the debug log of interest is S, each line of the debug log may be uniquely represented by an S-dimensional one-hot vector. However, the one-hot vector that represents each line of the debug log is not a distributed representation vector. In fact, these vectors are not related to each other at all, and the cosine similarity between all the vectors is 0. Consequently, the lines in the log are not similar.

The order in which the lines forming the debug log may indicate the characteristics of the operation of the target device 50, such as occurrence of a defect. Therefore, given a particular line of the debug log, it is possible to predict the lines around the particular line. For example, if two adjacent lines are extracted from the lines that make up the debug log, one is called Context, and the other is Target, and when a particular Context is given, by learning the embedded matrix (weight) W for predicting Target, each column vector of the embedded matrix W can be made a distributed representation vector of each row of the debug log.

For example, when the embedded matrix W is $W=(w_1\ w_2\ \ldots\ w_S)$ ($w_i$ is a column vector) as illustrated in FIG. 5A and when a context (i-th Line) is given, if the one-hot vector of the i-th row (a column vector in which only the i-th element is 1 and other elements are 0) is multiplied by the embedded matrix W, the i-th column vector $wi=(w_{i,1}, w_{i,2}, \ldots, w_{i,N})^T$ (intermediate layer in FIG. 5A), which is the N dimension of the embedded matrix W, is obtained. Further, by multiplying the column vector $w_i$ which is the intermediate layer by the matrix $W^T$ which is the transposed matrix of the embedded matrix W as illustrated in FIG. 5B, the column vector (output vector) $p=(p_1, p_2$ of the output layer, $\ldots, Ps)^T$ is obtained. However, the output vector p is passed through a softmax function in order to normalize the result. The embedded matrix W is updated so that the difference (error) between the output vector p and the correct value vector $p'=(p'_1, p'_2, \ldots, Ps)^T$ is reduced. Thus, the embedded matrix W for predicting Target can be obtained from Context. Then, as described above, when one-hot vector indicating the context is multiplied by the embedded matrix W, the i-th column vector $w_i$ is extracted, and only the column vector $w_i$ is used for the subsequent calculation. Therefore, the column vector $w_i$ can be regarded as a distributed representation vector indicating the characteristic of the i-th row.

By applying the Doc2Vec method in a similar way, a plurality of time-series debug logs (U debug logs) obtained for each internal function or module of the target device 50 are generated. In this case, the distributed representation vector di indicating the entire i-th debug log can be obtained. In this case, instead of the above-mentioned embedded matrix W, an embedded matrix $D=(d_1\ d_2\ \ldots\ d_i\ \ldots\ d_U)$ ($d_i$ is a column vector) as illustrated in FIG. 5C may be used.

Note that the distributed representation vector for the entire debug log is obtained in this example, but the present disclosure is not limited to this method. It is also possible to divide the log by the log division unit 23 and obtain the distributed representation vector for the divided log. For example, the log may be divided by a plurality of columns, predetermined time period, module, thread, function, file, or histogram matching.

The vector information generation unit 13 is implemented, for example, by executing a program by the CPU 101 illustrated in FIG. 2.

The similarity calculation unit 14 calculates similarity (for example, cosine similarity) between the distributed representation vectors generated by the vector information generation unit 13. The similarity calculation unit 14 is implemented, for example, by executing a program by the CPU 101 illustrated in FIG. 2.

The preprocessing unit 15 executes a preprocessing before the vector information generation unit 13 generates the distributed representation vector. As the preprocessing, for example, a process of removing information having low versatility such as a time stamp on the debug log (that is, non-essential information about the debug log), or a process that contributes to the generation of a distributed representation vector, such as a process in which the attention point is set to 0 and the time stamp is changed to a relative time from the attention point, can be cited. The preprocessing unit 15 is implemented, for example, by executing a program by the CPU 101 illustrated in FIG. 2.

The integration determination unit 16 uses the calculation result (identification result) of the similarity by the similarity calculation unit 14 on each of a plurality of functions or modules in the target device 50 as a weak discriminator and integrates these weak discriminators into a strong discriminator to be used for a final calculation result. For example, the integration determination unit 16 uses a learner learned by an algorithm such as boosting which is one of ensemble learning. The integration determination unit 16 is implemented by, for example, the CPU 101 illustrated in FIG. 2 executing a program.

The event histogram control unit 17 performs class classification by creating a histogram from the number of output lines per unit time of the debug log and comparing the created histogram with a histogram previously created as dictionary data. For example, the event histogram control unit 17 calculates the inner product of the vector between the histogram created with the number of output lines of the debug log per second and the histogram as the dictionary data. The histogram created in this way is important information in the case where there is regularity in the output form of the debug log when a failure occurs. The event histogram control unit 17 is implemented, for example, by executing a program by the CPU 101 illustrated in FIG. 2.

The fixed logic control unit 18 makes a determination by a fixed logic for each classification according to the classification based on the similarity calculated by the similarity calculation unit 14 in order to perform subclassification in the classification. Here, for example, a character string search or the like corresponds to the fixed logic. The fixed logic may be configured with different logic and different conditions depending on each classification. For example, the fixed logic control unit 18 searches for a character string "REJECT:" in accordance with a particular fixed logic when the character string is classified into the class "A", and when the character string "REJECT:" exists, the fixed logic control unit 18 subclassifies according to the number listed after the character string. The fixed logic control unit 18 is implemented, for example, by executing a program by the CPU 101 illustrated in FIG. 2.

The result display control unit 19 displays on the display 108, the calculation result (identification result) of the similarity degree by the similarity calculation unit 14, the final result derived by the integration determination unit 16, the result of the subclassification performed by the fixed logic control unit 18, and the like. The result display control unit 19 is implemented, for example, by executing a program by the CPU 101 illustrated in FIG. 2.

The similar information list display control unit 20 sorts the identification results when the similarity calculated by the similarity calculation unit 14 is equal to or higher than a certain value, in order from high similarity to low similarity, and causes the display 108 to display the list. The similar information list display control unit 20 is implemented, for example, by executing a program by the CPU 101 illustrated in FIG. 2.

When the malfunction analysis unit 21 determines that the similarity calculation result (identification result) by the similarity calculation unit 14 is the same as the past malfunction information, and the analysis process for the malfunction indicated by the past malfunction information is requested, the malfunction analysis unit 21 performs analysis processing (malfunction analysis processing) similar to the requested analysis process on the identification result. When the analysis processing is to be performed, the malfunction analysis unit 21 may not perform the malfunction analysis and the analysis processing may be issued to a different module or the outside of the information processing apparatus 10. Further, as the analysis processing, for example, the person in charge of the defective module may be notified by e-mail or the like. The malfunction analysis unit 21 is implemented, for example, by executing a program by the CPU 101 illustrated in FIG. 2.

The failure prediction control unit 22 determines if the similarity calculation result (identification result) by the similarity calculation unit 14 is the same as the past failure information, and automatically issues orders of the replacement parts and the like necessary based on the past failure information according to the determination indicating that the calculation result is the same as the past failure information. The failure prediction control unit 22 is implemented, for example, by executing a program by the CPU 101 illustrated in FIG. 2.

The log division unit 23 divides the debug log in order to improve the state in which the debug log cannot be correctly determined due to the large number of output lines of the debug log, such as when a plurality of functions or modules are operating at the same time. The log division unit 23 is implemented, for example, by executing a program by the CPU 101 illustrated in FIG. 2.

The external cooperation control unit 24 refers to (obtains) necessary information from an external device or the like, when at least one of the past accumulated debug log, dictionary data, and fixed logic is stored in the external device. As a result, a plurality of devices are linked, and the latest data can be referred to. The external cooperation control unit 24 is implemented, for example, by executing a program by the CPU 101 illustrated in FIG. 2.

The sensor data acquisition unit 25 acquires sensor data received through the sensor I/F 105 or from the target device 50 through the communication unit 11. The sensor data acquisition unit 25 is implemented, for example, by executing a program by the CPU 101 illustrated in FIG. 2.

The sensor data control unit 26 calculates the similarity using not only the debug log but also the sensor data acquired by the sensor data acquisition unit 25 that is an example of non-debug log. As a method of calculating the degree of similarity based on the sensor data, for example, when the sensor data is one-dimensional information, the absolute value of the difference between the values is calculated, and when the sensor data is two-dimensional information, the inner product of the values is calculated. The sensor data control unit 26 is implemented, for example, by executing a program by the CPU 101 illustrated in FIG. 2.

The usage information control unit 27 determines whether the similarity calculation result (identification result) by the similarity calculation unit 14 is the same as other usage information, and when the determination indicates the similarity calculation result is the same as the other usage information, specifies a recommended application or function indicated by the usage information, and performs usage information processing such as presentation of the specified information. Examples of the usage information processing include displaying an application or function recommended to the user indicated by the usage information on the display 108 or sending recommendation to an email address for use in marketing. The usage information control unit 27 is implemented, for example, by the CPU 101 illustrated in FIG. 2 executing a program.

The malfunction module restriction unit 28 stops the operation of the module when a malfunction is identified by the malfunction analysis processing performed by the malfunction analysis unit 21. As a result, adverse effects on other modules are reduced. In addition, when the software of the module in which the malfunction has occurred is updated, the malfunction module restriction unit 28 restarts the operation of that module after installing the software of the updated version. The malfunction module restriction unit 28 is implemented, for example, by executing a program by the CPU 101 illustrated in FIG. 2.

The setting unit 29 sets on/off of debug log division, debug log dividing methods, on/off of debug log integration, various thresholds, and the like according to the user's input to the operation input unit 31.

For example, the debug log division setting screen 1000 illustrated in FIG. 6 is a screen for making settings (division conditions) regarding the debug log division operation by the log division unit 23. In the debug log division setting screen 1000, as illustrated in FIG. 6, "On" or "Off" of division of the debug log, division methods of the debug log (for example, number of lines, time, number of modules, number of threads, number of functions, number of files, matching histogram of the debug log), "On" or "Off" of upper and lower limits of the number of divisions of the debug log, upper and lower limits thereof, new registration of the division method of the debug log, and the like are to be set. As illustrated in FIG. 6, the debug log division setting screen 1000 includes priority setting buttons 1001, a log division upper limit setting box 1002, a log division lower limit setting box 1003, a new log division method registration button 1004, an enter button 1011, and a cancel button 1012.

As illustrated in FIG. 6, the debug log division method can be selected by combining a plurality of check boxes. For example, when the division method of the debug log is "the number of lines", the dividing number is determined according to the number of output lines of the debug log per unit time. Accordingly, matching by the number of output lines of the debug log per unit time is performed, tendency of the debug log is determined, and the minimum necessary number of divisions is identified. In addition, since a plurality of division method can be combined and selected, it is possible to make a determination based on a plurality of conditions and then identify with the minimum necessary number of divisions.

The priority setting button 1001 is a button for weighting the priority of the corresponding debug log division method. For example, when the division method for dividing the debug log is set to "number of threads", important threads and unimportant threads should not be treated equally, so the weights of important threads and unimportant threads are changed. By setting the weight of information according to user needs, the number of divisions according to the settings is determined. As described above, since the weight can be set according to the priority of the dividing unit of the debug log, it is possible to give priority to the information that the user considers important.

The log division upper limit setting box 1002 is an input box for setting an upper limit when the upper and lower limits of the number of debug log divisions are "On". The log division lower limit setting box 1003 is an input box for setting the lower limit value when the upper and lower limits of the number of debug log divisions are "On".

The new log division method registration button 1004 is a button for newly registering a debug log division method.

The enter button 1011 is a button for confirming the settings set on the debug log division setting screen 1000 and storing the settings in the storage unit 30. The cancel button 1012 is a button for canceling the settings set on the debug log division setting screen 1000.

The debug log integration setting screen 1100 illustrated in FIG. 7 is a screen for making settings related to integration determination regarding the calculation result (identification result) of each similarity degree by the similarity calculation unit 14. In the debug log integration setting screen 1100, as illustrated in FIG. 7, "On" or "Off" of the debug log integration within a module, integration methods in the module (for example, the number of lines, time, number of modules, number of threads, number of functions, number of files, debug log histogram matching, etc.), "On" or "Off" of debug log integration determination between modules, new registration of debug log integration methods, and the like are to be set. As illustrated in FIG. 7, the debug log integration setting screen 1100 includes priority setting buttons 1101, a new log integration method registration button 1102, an enter button 1111 and a cancel button 1112.

The priority setting button 1101 is a button for setting priority of the corresponding debug log integration methods. The new log integration method registration button 1102 is a button for newly registering a debug log integration method.

The enter button 1111 is a button for confirming the settings set on the debug log integration setting screen 1100 and storing the settings in the storage unit 30. The cancel button 1112 is a button for canceling the settings set on the debug log integration setting screen 1100.

The debug log threshold setting screen 1200 illustrated in FIG. 8 is a screen for making settings related to various thresholds. On the debug log threshold setting screen 1200, as illustrated in FIG. 8, "On" or "Off" of determination by threshold, primary determination threshold (first threshold), secondary determination threshold (second threshold), priority determination threshold (third threshold), and the like are to be set. As illustrated in FIG. 8, the debug log threshold setting screen 1200 includes a primary determination threshold setting box 1201, a secondary determination threshold setting box 1202, a priority determination threshold setting box 1203, an enter button 1211, and a cancel button 1212.

The primary determination threshold setting box 1201 and the secondary determination threshold setting box 1202 are input boxes for setting a primary determination threshold and a secondary determination threshold to determine whether or not to make a determination by the fixed logic by the fixed logic control unit 18, based on the similarity calculated by the similarity calculation unit 14. The priority determination threshold setting box 1203 is an input box for setting a priority threshold that determines whether or not to interrupt the similarity calculation processing by the similarity calculation unit 14 for the debug log divided by the log division unit 23.

The enter button 1211 is a button for confirming the settings set on the debug log threshold setting screen 1200 and storing the settings in the storage unit 30. The cancel button 1212 is a button for canceling the settings set on the debug log threshold setting screen 1200.

The storage unit 30 stores, for example, information (vector information) of the distributed representation vector generated by the vector information generation unit 13, fixed logic information, the malfunction information, the failure information, the usage information, and the settings set on each setting screen described in FIGS. 6 to 8. The storage unit 30 is implemented by at least one of the RAM 103 and the auxiliary storage device 109 illustrated in FIG. 2.

The operation input unit 31 receives operation input from a user. The operation input unit 31 is implemented by the input device 107 illustrated in FIG. 2.

The log information acquisition unit 12, the vector information generation unit 13, the similarity calculation unit 14, the preprocessing unit 15, the integration determination unit 16, the event histogram control unit 17, the fixed logic control unit 18, the result display control unit 19, the similar information list display control unit 20, the malfunction analysis unit 21, the failure prediction control unit 22, the log division unit 23, the external cooperation control unit 24, the sensor data acquisition unit 25, the sensor data control unit 26, the usage information control unit 27, the malfunction module restriction unit 28, and the setting unit 29 of the information processing apparatus 10 illustrated in FIG. 3 are not limited to being implemented by executing a program by the CPU 101 illustrated in FIG. 2, and may be implemented by hardware such as an integrated circuit (IC) or the like.

Further, each functional unit of the information processing apparatus 10 illustrated in FIG. 3 conceptually illustrates a function and is not limited to such a configuration. For example, a plurality of functional units illustrated as independent functional units in the information processing apparatus 10 illustrated in FIG. 3 may be configured as one functional unit. On the other hand, in the information processing apparatus 10 illustrated in FIG. 3, function of one functional unit may be divided into a plurality of units to be configured as a plurality of functional units.

Figure 9:
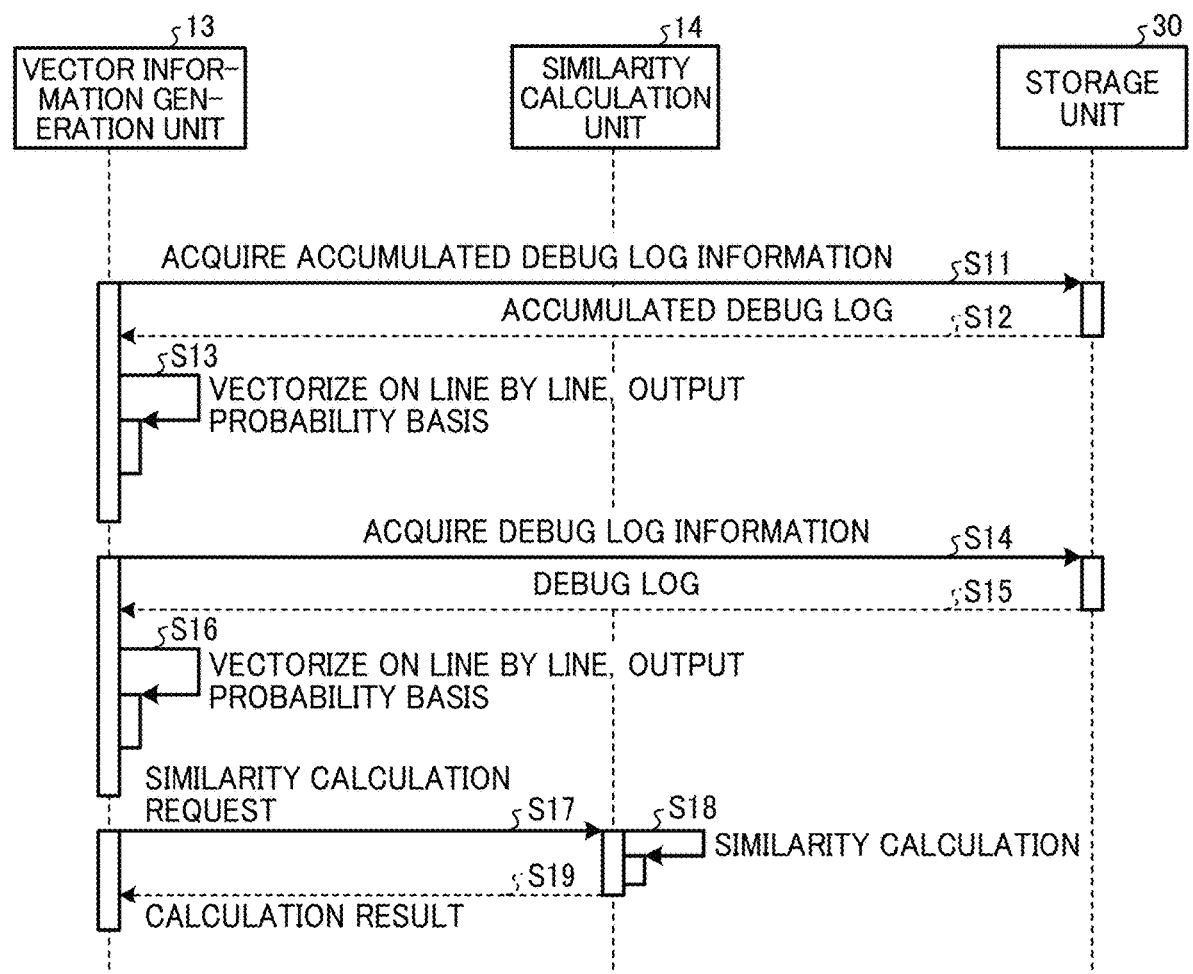
FIG. 9 is a sequence diagram illustrating an example of a debug log similarity calculation process in the information processing apparatus according to embodiments of the present disclosure.

FIG. 9 is a sequence diagram illustrating an example of a debug log similarity calculation process in the information processing apparatus according to the present embodiment. The debug log similarity calculation process executed by the information processing apparatus 10 according to the present embodiment is described with reference to FIG. 9.

In steps S11 and S12, the vector information generation unit 13 reads and acquires a debug log stored in the storage unit 30 in advance as dictionary data.

In step S13, the vector information generation unit 13 vectorizes, with the distributed representation, the accumulated debug log read from the storage unit 30 on the line-by-line basis, according to output probability. Hereinafter, the distributed representation vector calculated for the debug log accumulated in the storage unit 30 may be referred to as a "dictionary vector" (second vector). In addition, the vector information generation unit 13 may vectorize the debug log into the distributed representation vector before storing in the storage unit 30.

In step S14, the log information acquisition unit 12 acquires the debug log generated by the target device 50 through the communication unit 11 and stores the debug log in the storage unit 30. In step S15, the vector information generation unit 13 reads the debug log acquired by the log information acquisition unit 12 from the storage unit 30 and acquires the debug log.

In step S16, the vector information generation unit 13 vectorizes, with distributed representation, the debug log acquired by the log information acquisition unit 12 read from the storage unit 30 on the line-by-line basis, according to output probability. Hereinafter, the distributed representation vector calculated for the debug log acquired by the log information acquisition unit 12 stored in the storage unit 30 may be referred to as an "input vector" (first vector).

In step S17, the vector information generation unit 13 sends the dictionary vector and the input vector to the similarity calculation unit 14 together with the similarity calculation request.

In step S18, in response to receiving the similarity calculation request from the vector information generation unit 13, the similarity calculation unit 14 calculates the similarity between the dictionary vector and the input vector. In step S19, the similarity calculation unit 14 returns the calculated similarity as a calculation result to the vector information generation unit 13.

In this way, by generating the distributed representation vector from the debug log on a line-by-line basis, calculations among the debug logs are performed, and it is possible to analyze what is considered to be defective only by the combination or order of the debug logs.

Figure 10:
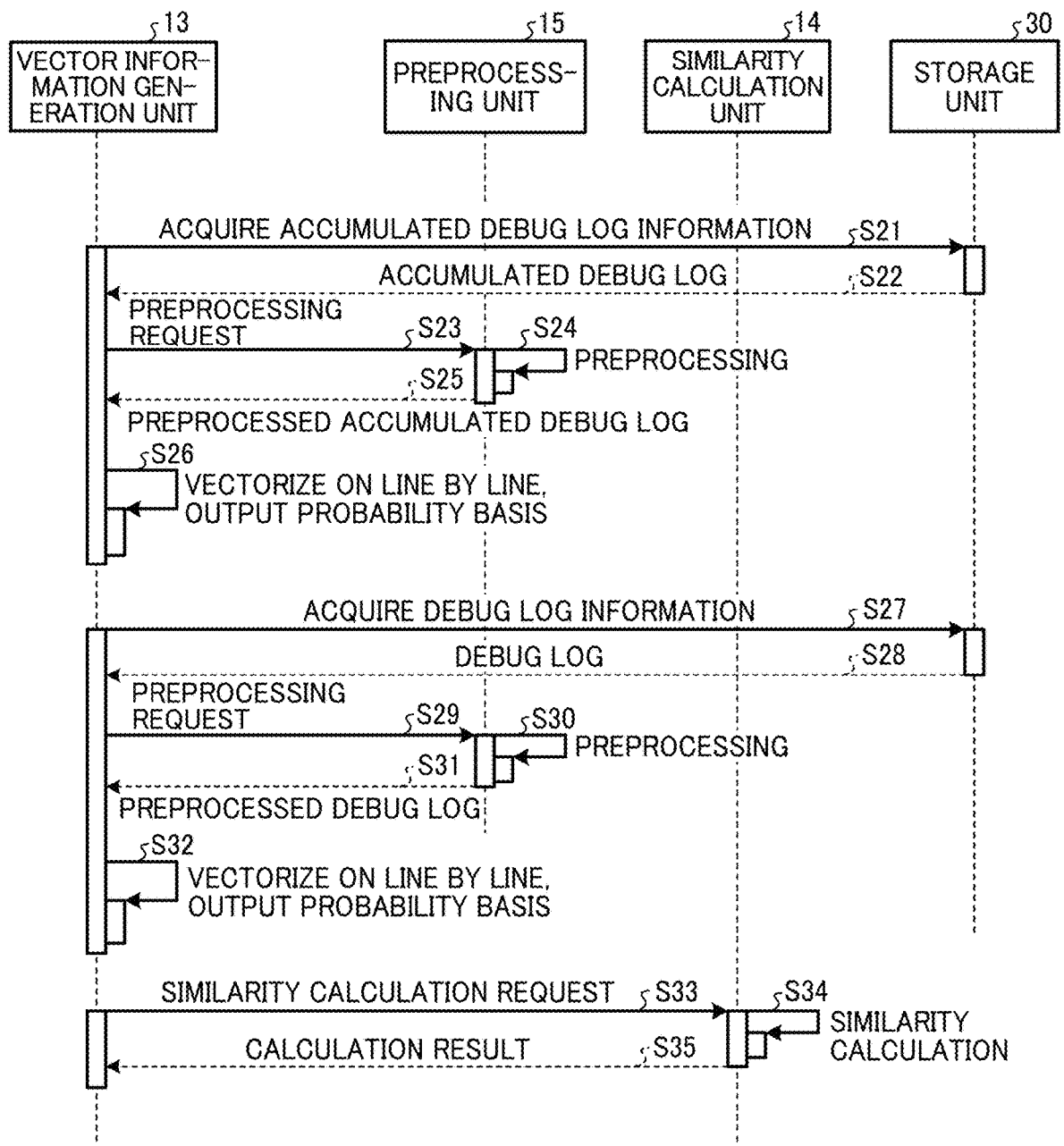
FIG. 10 is a sequence diagram illustrating an example of the debug log similarity calculation process involving preprocessing in the information processing apparatus according to embodiments of the present disclosure.

FIG. 10 is a sequence diagram illustrating an example of the debug log similarity calculation process involving preprocessing in the information processing apparatus according to the present embodiment. With reference to FIG. 10, the debug log similarity calculation process including preprocessing by the information processing apparatus 10 according to the present embodiment is described.

In steps S21 and S22, the vector information generation unit 13 reads and acquires a debug log stored in the storage unit 30 in advance as dictionary data.

In step S23, the vector information generation unit 13 sends the read accumulated debug log together with the preprocessing request to the preprocessing unit 15.

In response to receiving the preprocessing request, the preprocessing unit 15 executes the above-described preprocessing on the accumulated debug log in step S24. In step S25, the preprocessing unit 15 returns the accumulated debug log after the preprocessing to the vector information generation unit 13. Note that, when storing in the storage unit 30, the debug log in which the preprocessing is executed by the preprocessing unit 15 in advance may be stored. However, when the preprocessing method is changed, it is necessary to store the debug log for which the preprocessing after the change has been performed again.

In step S26, the vector information generation unit 13 vectorizes, with the distributed representation, the preprocessed accumulated debug log received from the preprocessing unit 15 on the line-by-line basis, according to output probability and generates a dictionary vector.

In step S27, the log information acquisition unit 12 acquires the debug log generated by the target device 50 through the communication unit 11 and stores the debug log in the storage unit 30. In step S28, the vector information generation unit 13 reads the debug log acquired by the log information acquisition unit 12 from the storage unit 30 and acquires the debug log.

In step S29, the vector information generation unit 13 sends the preprocessing request and the debug log acquired by the log information acquisition unit 12 to the preprocessing unit 15.

In response to receiving the preprocessing request, the preprocessing unit 15 executes the above-described preprocessing on the debug log acquired by the log information acquisition unit 12 in step S30. In step S31, the preprocessing unit 15 returns the preprocessed debug log to the vector information generation unit 13.

In step S32, the vector information generation unit 13 vectorizes, with the distributed representation, the preprocessed debug log received from the preprocessing unit 15 on the line-by-line basis, according to output probability to generate the input vector.

In step S33, the vector information generation unit 13 sends the dictionary vector and the input vector to the similarity calculation unit 14 together with the similarity calculation request.

In response to receiving the similarity calculation request from the vector information generation unit 13, the similarity calculation unit 14 calculates the similarity between the dictionary vector and the input vector in step S34. In step S35, the similarity calculation unit 14 returns the calculated similarity as a calculation result to the vector information generation unit 13.

In this way, the accuracy of identification when calculating the similarity of the debug log is improved with a process that removes information with low versatility such as a time stamp on the debug log or a machine number (that is, non-essential information about the debug log), or by performing preprocessing such as processing in which the target point is set to 0 and the time stamp is changed to the relative time from the target point. In addition, by setting the target point to 0 and changing the time stamp to the relative time from the target point in preprocessing, the time information in the debug log is normalized centering on the occurrence timing and accuracy of identification is improved.

Figure 11:
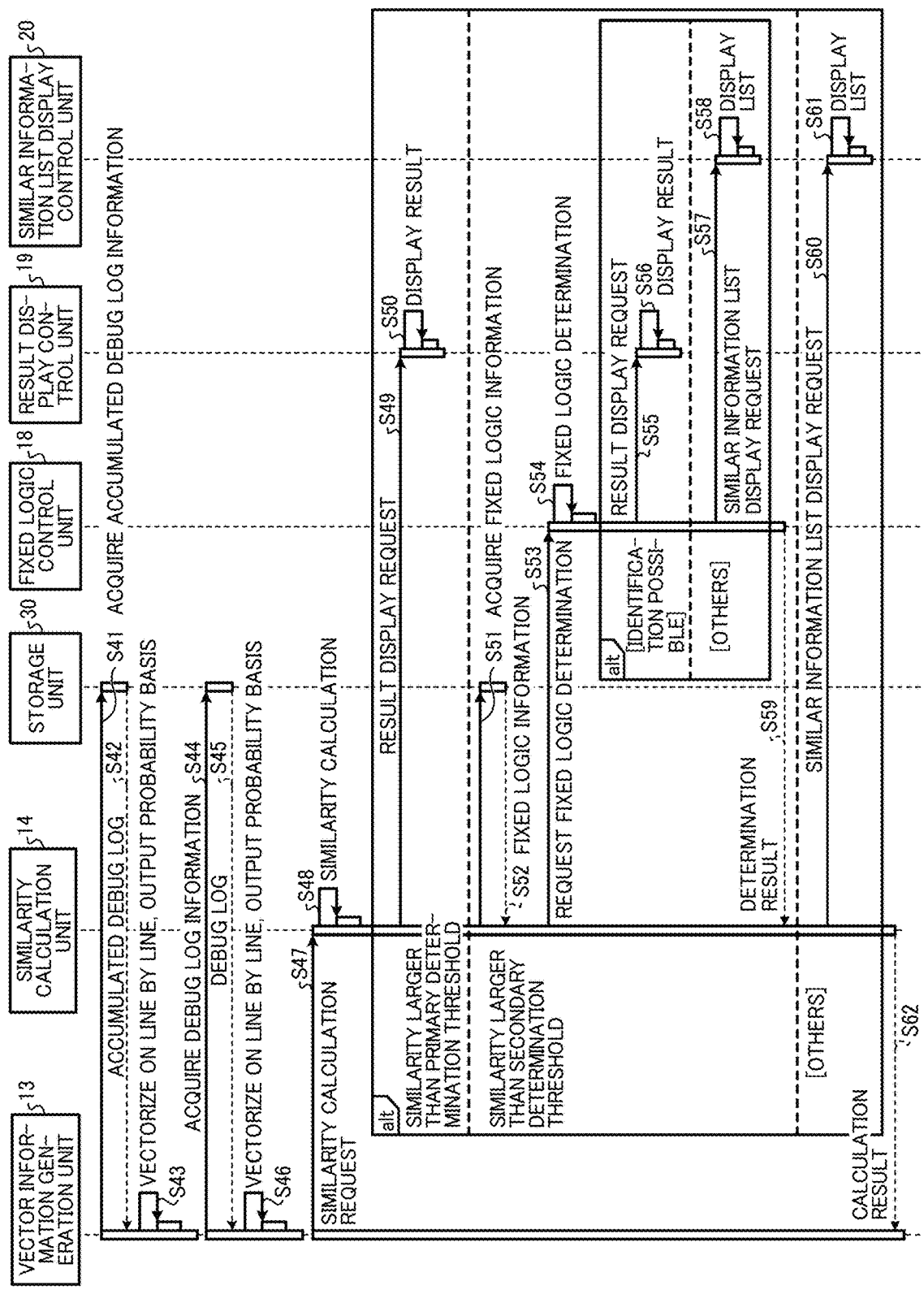
FIG. 11 is a sequence diagram illustrating an example of the debug log similarity calculation process that involves fixed logic determination in the information processing apparatus according to embodiments of the present disclosure.

FIG. 11 is a sequence diagram illustrating an example of the debug log similarity calculation process that involves fixed logic determination in the information processing apparatus according to the present embodiment. With reference to FIG. 11, the debug log similarity calculation process involving the fixed logic determination by the information processing apparatus 10 according to the present embodiment is described.

The process of steps S41 to S48 is the same as the process of steps S11 to S18 illustrated in FIG. 9 described above.

In step S49, when the determination by the threshold is set to "On" in the debug log threshold setting screen 1200 illustrated in FIG. 8 described above and when the similarity calculated by the similarity calculation unit 14 is larger than the primary determination threshold, the similarity calculation unit 14 sends the calculated similarity to the result display control unit 19 together with the result display request. In step S50, in response to receiving the result display request, the result display control unit 19 causes the display 108 to display the similarity calculated by the similarity calculation unit 14 as an identification result.

In steps S51 and S52, when determination by threshold is set to "On" in the debug log threshold setting screen 1200 illustrated in FIG. 8 described above, and when the similarity calculated by the similarity calculation unit 14 is larger than the secondary determination threshold and equal to or smaller than the primary determination threshold, the similarity calculation unit 14 reads and acquires fixed logic information from the storage unit 30.

In step S53, the similarity calculation unit 14 sends the acquired fixed logic and the calculated similarity to the fixed logic control unit 18 together with the fixed logic determination request.

In step S54, in response to the fixed logic determination request, the fixed logic control unit 18 makes determination by the fixed logic indicated by the fixed logic information for each classification in order to carry out sub-classification in the classification, according to the classification based on the similarity calculated by the similarity calculation unit 14.

In step S55, when the determination result by the fixed logic by the fixed logic control unit 18 is identifiable, the fixed logic control unit 18 sends the determination result to the result display control unit 19 together with the result display request. In step S56, in response to receiving the result display request, the result display control unit 19 causes the display 108 to display the determination result by the fixed logic control unit 18.

In step S57, when the determination result by the fixed logic by the fixed logic control unit 18 is not identifiable, the fixed logic control unit 18 sends the determination result by the fixed logic to the similar information list display control unit 20 together with the similar information list display request. In response to receiving the similar information list display request, the similar information list display control unit 20 causes the display 108 to display a list of similarity based on the determination result by the fixed logic in step S58.

In step S59, the fixed logic control unit 18 returns the determination result by the fixed logic to the similarity calculation unit 14.

When the determination based on the threshold is set to "Off" in the debug log threshold setting screen 1200 illustrated in FIG. 8 described above, or the similarity calculated by the similarity calculation unit 14 is equal to or less than the secondary determination threshold, the similarity calculation unit 14 sends the similarity information calculation result together with the similarity information list display request to the similar information list display control unit 20 in step S60. In response to receiving the similar information list display request, the similar information list display control unit 20 causes the display 108 to display the list of the similarity calculated by the similarity calculation unit 14 in step S61. As a result, it is possible to refer to the past case where the related debug log appears, although the identification based on the high degree of similarity cannot be performed.

The similarity calculation unit 14 returns the calculated similarity as a calculation result to the vector information generation unit 13 in step S62.

As described above, based on the similarity calculated by the similarity calculation unit 14, when the large classification is successful, but the small classification cannot be performed, the large classification can be identified by the fixed logic to the small classification.

Figure 12B:
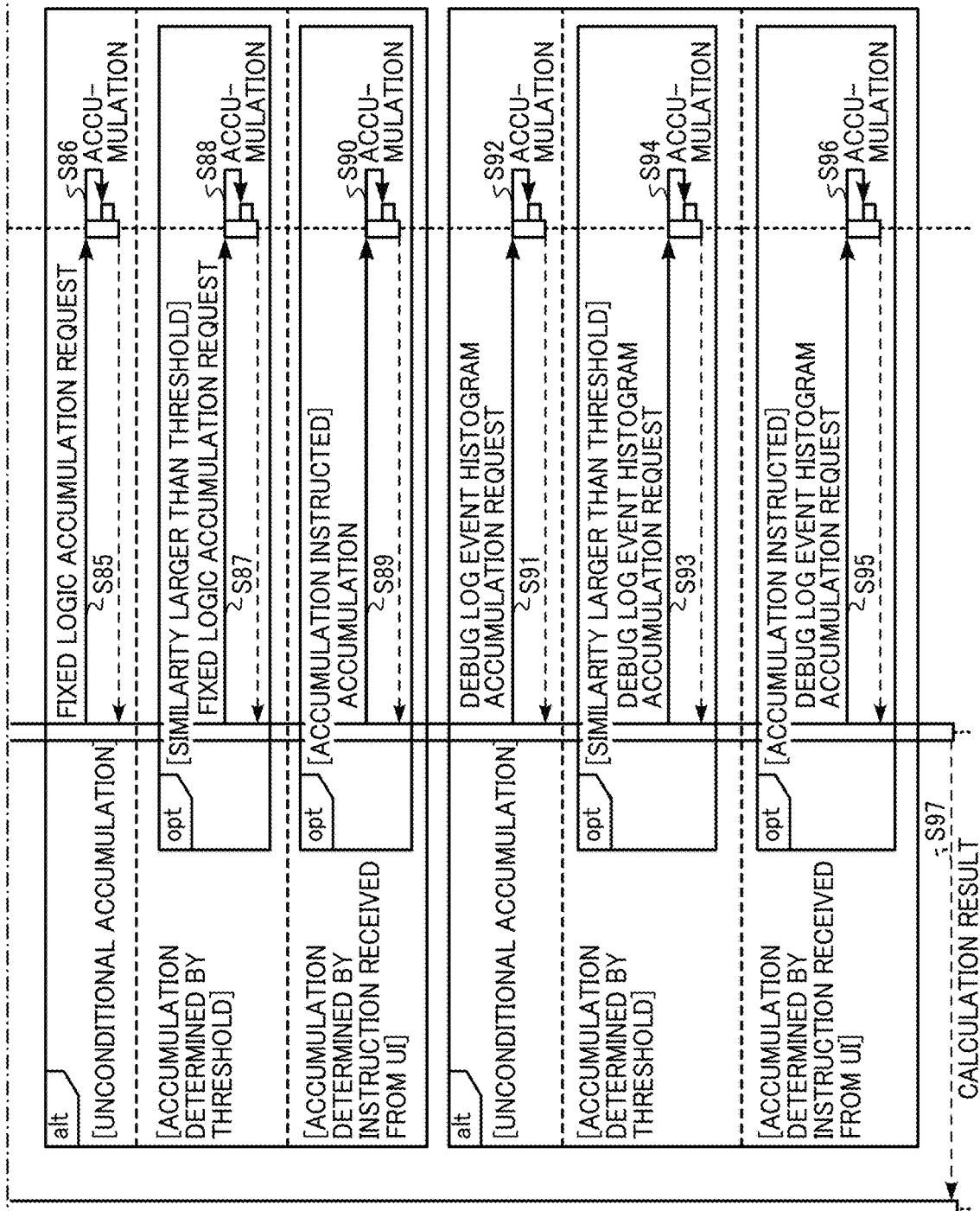

FIGS. 12A and 12B are sequence diagrams illustrating an example of the debug log similarity calculation process involving information accumulation in the information processing apparatus according to the present embodiment. With reference to FIG. 12, the debug log similarity calculation process involving information accumulation by the information processing apparatus 10 according to the present embodiment is described. Note that the setting unit 29 can make settings relating to accumulation of a debug log (input debug log) acquired by the log information acquisition unit 12, fixed logic information, and an event histogram created by the event histogram control unit 17. Specifically, the setting unit 29 allows setting of whether the above information is stored unconditionally, the above information is stored when the similarity of the input vector is larger than a predetermined threshold, or the above information is accumulated when the user performs an OK operation on the confirmation screen displayed on the display 108.

The process of steps S71 to S78 is the same as the process of steps S11 to S18 illustrated in FIG. 9 described above.

When the unconditional accumulation is set in the setting unit 29, the similarity calculation unit 14 causes the storage unit 30 to accumulate the input debug log in steps S79 and S80.

When the input debug log is set to accumulate when the similarity of the input vector is larger than a predetermined threshold in the setting unit 29 and the similarity is larger than the predetermined threshold, the similarity calculation unit 14 causes the input debug log to be stored in the storage unit 30 in steps S81 and S82.

In steps S83 and S84, when the input debug log is set to be accumulated in response to the OK operation by the user on the confirmation screen displayed on the display 108 in the setting unit 29, and when the OK operation is performed on the confirmation screen, the similarity calculation unit 14 causes the input debug log to be accumulated in the storage unit 30.

In this way, the dictionary data is continuously updated by storing the input debug log in the storage unit 30.

In steps S80, S82, and S84 described above, the debug log may be stored in the storage unit 30 according to the similarity calculated by the similarity calculation unit 14 in step S78. For example, the input debug log may be stored in the storage unit 30 when the similarity is equal to or higher than a predetermined threshold. In this way, by adding only the input debug log having high similarity and high reliability to the dictionary data, the quality of the dictionary data is secured.

When the setting unit 29 is set to store the input debug log unconditionally, the similarity calculation unit 14 stores the fixed logic information in the storage unit 30 in steps S85 and S86.

When the fixed logic information is set to be accumulated when the similarity of the input vector is larger than a threshold set in the setting unit 29 and the similarity is larger than the threshold, the similarity calculation unit 14 causes the fixed logic information to be stored in the storage unit 30 in steps S87 and S88.

When the fixed logic information is set in the setting unit 29, to be stored when the OK operation is performed by the user on the confirmation screen displayed on the display 108, the similarity calculation unit 14 causes the fixed logic information to be stored in the storage unit 30 in response to the OK operation in steps S89 and S90.

In this way, by accumulating the fixed logic information, it becomes possible to follow up even if the contents of the fixed logic are changed by the addition of function or the like from the next time.

In steps S91 and S92, the similarity calculation unit 14 stores the histogram created by the event histogram control unit 17 in the storage unit 30 when unconditional storage is set in the setting unit 29.

In steps S93 and S94, the similarity calculation unit 14 stores the histogram created by the event histogram control unit 17 in the storage unit 30, when the setting unit 29 is set to accumulate when the similarity of the input vector is larger than a predetermined threshold, and the similarity is larger than the predetermined threshold.

When the setting unit 29 is set to store the histogram created by the event histogram control unit 17 in the storage unit 30 in response to the OK operation on the confirmation screen displayed on the display 108, the similarity calculation unit 14 stores the histogram in response to the OK operation in steps S95 and S96.

As described above, by accumulating the histograms, the information of the registered histograms is used for identification from next time.

The similarity calculation unit 14 returns the calculated similarity as a calculation result to the vector information generation unit 13 in step S97.

As described above, in steps S83, S89 and S95, the information is stored in the storage unit 30 in response to the OK operation on the confirmation screen displayed on the display 108 when the information is set to be stored when the OK operation is received, in the setting unit 29. As a result, the user can individually select whether or not the information should be used from the next time onward.

Figure 13B:
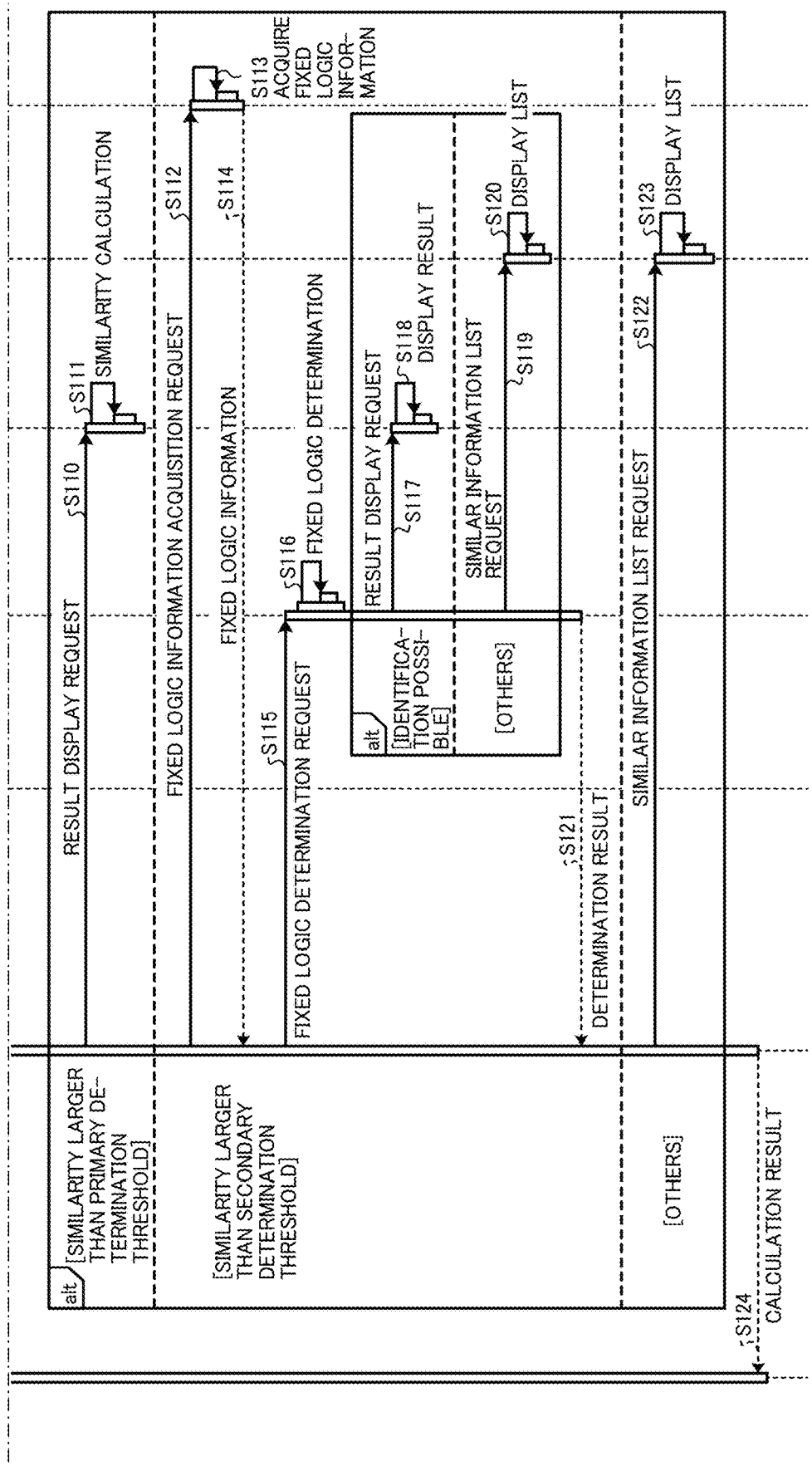

FIGS. 13A and 13B are sequence diagrams illustrating an example of the debug log similarity calculation process involving external cooperation in the information processing apparatus according to the present embodiment. With reference to FIGS. 13A and 13B, a debug log similarity calculation process involving external cooperation by the information processing apparatus 10 according to the present embodiment is described.

In step S101, the vector information generation unit 13 sends a request to acquire the accumulated debug log to the external cooperation control unit 24.

In response to the acquisition request for the accumulated debug log, the external cooperation control unit 24 acquires the accumulated debug log as dictionary data from an external device such as an external server in step S102 and returns the accumulated debug log to the vector information generation unit 13 in step S103. The dictionary data is centrally managed by the external device by acquiring the accumulated debug log as dictionary data from the external device such as the external server.

The vector information generation unit 13 vectorizes, with the distributed representation, the accumulated debug log received from the external cooperation control unit 24 on the line-by-line basis, according to output probability to generate the dictionary vector in step S104.

The process of steps S105 to S109 is the same as the process of steps S14 to S18 illustrated in FIG. 9 described above.

In step S110, when the determination by the threshold is set to "On" in the debug log threshold setting screen 1200 illustrated in FIG. 8 described above and when the similarity calculated by the similarity calculation unit 14 is larger than the primary determination threshold, the similarity calculation unit 14 sends the calculated similarity to the result display control unit 19 together with the result display request. In step S111, in response to receiving the result display request, the result display control unit 19 causes the display 108 to display the similarity calculated by the similarity calculation unit 14 as an identification result.

In step S112, the similarity calculation unit 14 sends a request for acquiring fixed logic information to the external cooperation control unit 24 when determination by threshold is set to "On" in the debug log threshold setting screen 1200 illustrated in FIG. 8 described above, and when the similarity calculated by the similarity calculation unit 14 is larger than the secondary determination threshold and equal to or smaller than the primary determination threshold.

In response to receiving the acquisition request for the fixed logic information, the external cooperation control unit 24 acquires the fixed logic information from the external device such as the external server in step S113 and returns the fixed logic information to the vector information generation unit 13 in step S114. The fixed logic information is centrally managed by the external device by acquiring the fixed logic information from the external device such as the external server.

The process of steps S115 to S124 is the same as the process of steps S53 to S62 illustrated in FIG. 11 described above.

Figure 14:
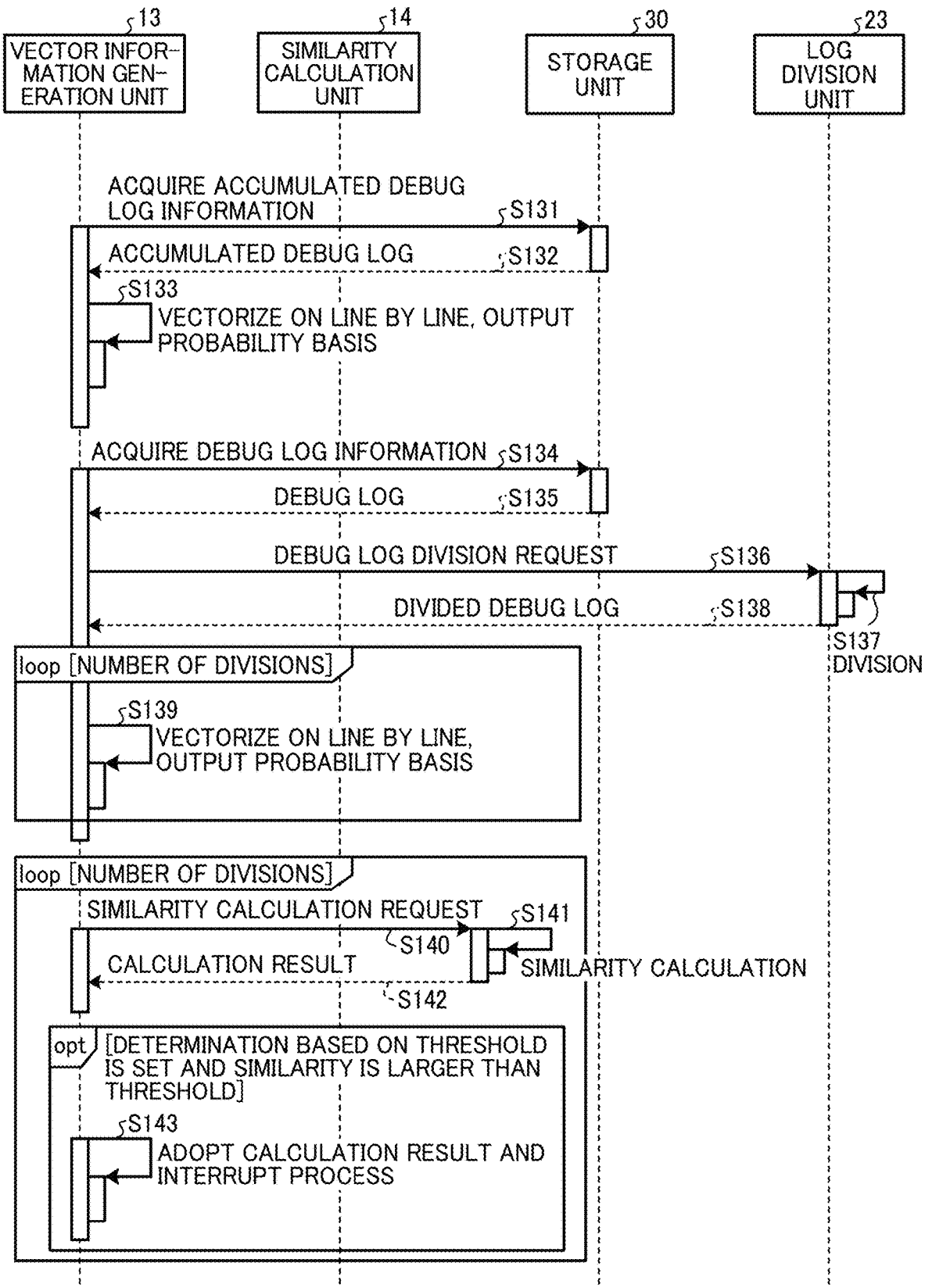
FIG. 14 is a sequence diagram illustrating an example of the debug log similarity calculation process involving division of debug logs in the information processing apparatus according to embodiments of the present disclosure.

FIG. 14 is a sequence diagram illustrating an example of the debug log similarity calculation process involving division of debug log in the information processing apparatus according to the present embodiment. With reference to FIG. 14, a debug log similarity calculation process involving division of a debug log by the information processing apparatus 10 according to the present embodiment is described.

The process of steps S131 to S135 is the same as the process of steps S11 to S15 illustrated in FIG. 9 described above.

When the debug log division setting screen 1000 illustrated in FIG. 6 described above indicates that the debug log is to be divided, the vector information generation unit 13 sends the debug log (input debug log) acquired by the log information acquisition unit 12 to the log division unit 23 together with the debug log division request in step S136.

In response to the debug log division request, the log division unit 23 divides the input debug log according to the debug log division method, "On" or "Off" of upper and lower limits of the number of divisions of the debug log, and upper and lower limits set on the debug log division setting screen 1000 in step S137. By dividing the input debug log according to the conditions set as described above, identification of the input debug log with the minimum necessary number of divisions according to the state of the input debug log becomes possible. In step S138, the log division unit 23 returns the divided input debug log to the vector information generation unit 13.

In step S139, the vector information generation unit 13 vectorizes the distributed representation for each log portion divided for the input debug log on the line-by-line basis, according to output probability, and generates the input vector.

In step S140, the vector information generation unit 13 sends the dictionary vector and the input vector to the similarity calculation unit 14 together with the similarity calculation request for each generated input vector.

In response to receiving the similarity calculation request from the vector information generation unit 13, the similarity calculation unit 14 calculates the similarity between the dictionary vector and the input vector in step S141. In step S142, the similarity calculation unit 14 returns the calculated similarity as a calculation result to the vector information generation unit 13.

When the determination based on the threshold is set to "On" on the debug log threshold setting screen 1200 illustrated in FIG. 8 described above, and the similarity calculated by the similarity calculation unit 14 is larger than the priority determination threshold, the vector information generation unit 13 adopts the similarity and interrupts the similarity calculation process by the similarity calculation unit 14 in step S143.

The above steps S140 to S143 are repeated until it is determined in step S143 that the similarity calculated by the similarity calculation unit 14 is larger than the priority determination threshold. However, the maximum value of the number of repetitions is the number of divisions of the input debug log by the log division unit 23 in step S137 described above.

The overall processing time can be shortened by interrupting subsequent calculation of similarity when the similarity larger than the priority determination threshold is obtained.

Figure 15:
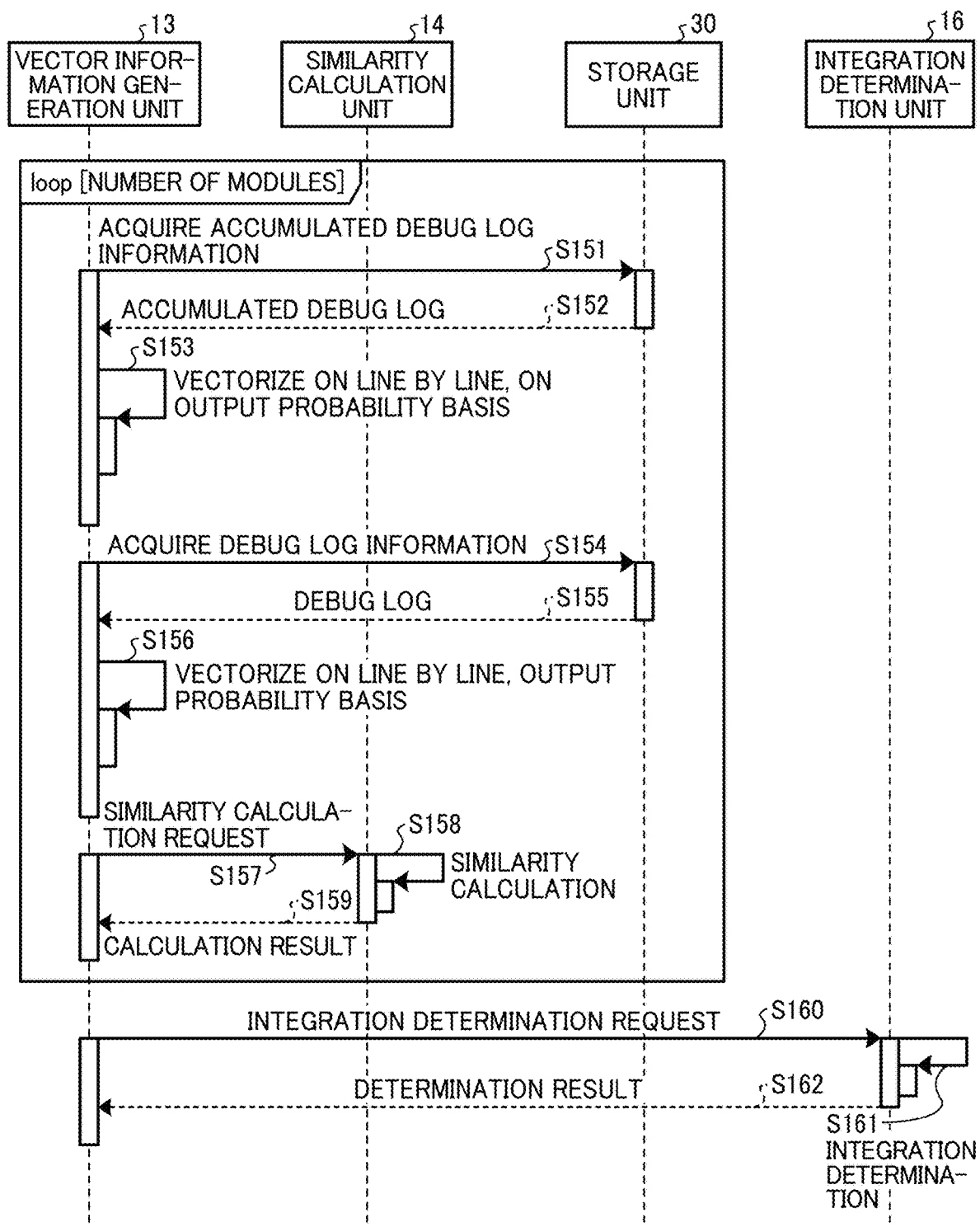
FIG. 15 is a sequence diagram illustrating an example of the debug log similarity calculation process involving integration determination for a plurality of modules in the information processing apparatus according to embodiments of the present disclosure.

FIG. 15 is a sequence diagram illustrating an example of the debug log similarity calculation process involving integration determination for a plurality of modules in the information processing apparatus according to the present embodiment. With reference to FIG. 15, the debug log similarity calculation process involving integration determination of a plurality of modules by the information processing apparatus 10 according to the present embodiment is described.

The process of steps S151 to S159 is the same as the process of steps S11 to S19 illustrated in FIG. 9 described above. However, the information processing apparatus 10 repeats the above-described process for the number of modules to be processed for the debug log. Note that the plurality of modules may be a plurality of modules included in one target device 50 or may be a plurality of modules obtained by integrating one or more modules of each target device 50 of the plurality of target devices 50. Further, the plurality of modules may be regarded as a plurality of functions.

In step S160, the vector information generation unit 13 sends the integration determination request and the similarity calculated by the similarity calculation unit 14 for each module to the integration determination unit 16.

In response to receiving the integration determination request, the integration determination unit 16 performs integration determination on the similarity calculated by the similarity calculation unit 14 as weak discriminators and derives the determination result as a strong discriminator in step S161. In step S162, the integration determination unit 16 returns the determination result of the integration determination to the vector information generation unit 13.

As described above, the accuracy of identification is improved by calculating the similarity for the debug log corresponding to each module and integrating and determining the similarities.

Figure 16:
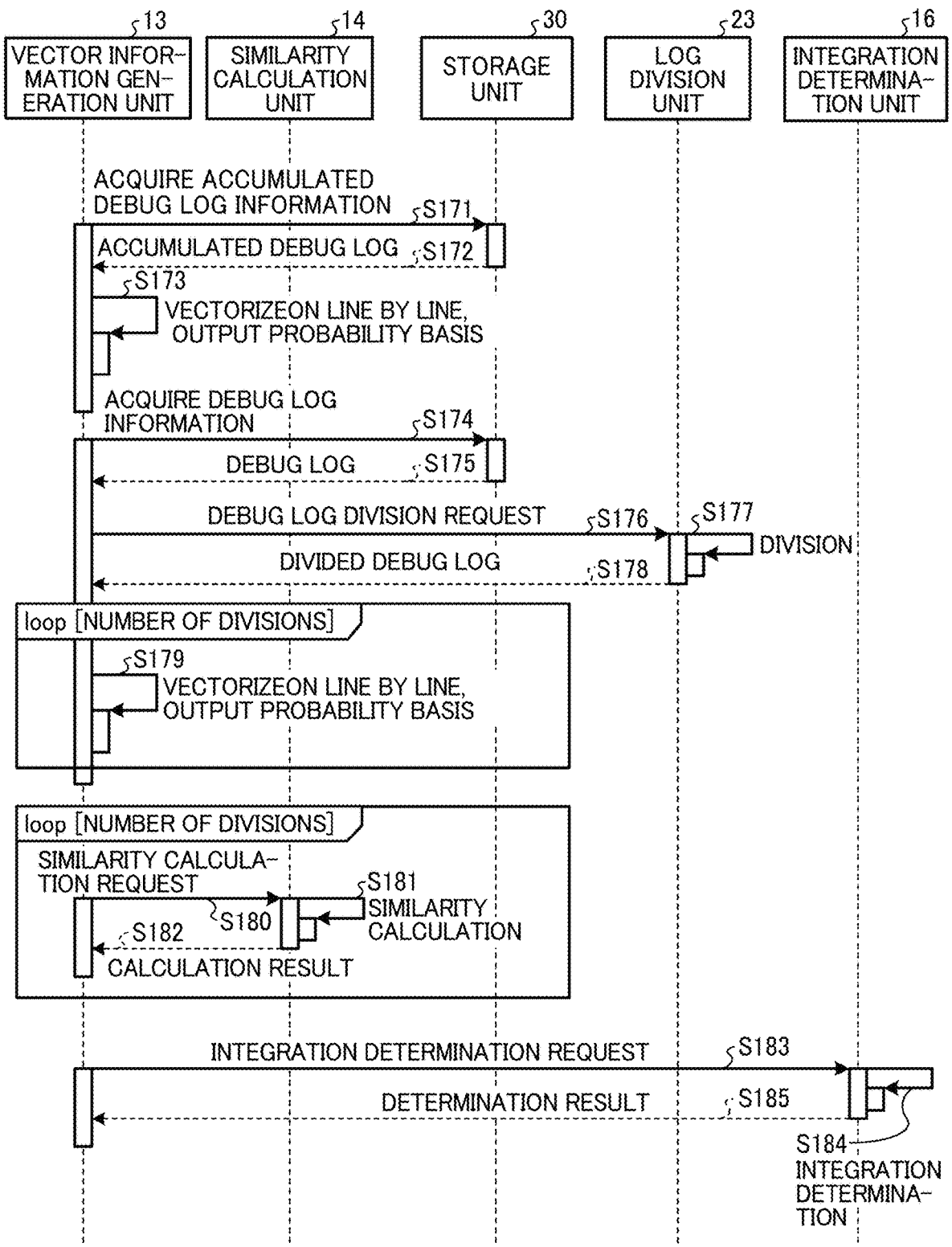
FIG. 16 is a sequence diagram illustrating an example of the debug log similarity calculation process involving integration determination of divided debug logs in the information processing apparatus according to embodiments of the present disclosure.

FIG. 16 is a sequence diagram illustrating an example of the debug log similarity calculation process involving integration determination of divided debug logs in the information processing apparatus according to the present embodiment. With reference to FIG. 16, the debug log similarity calculation process involving integration determination of divided debug logs by the information processing apparatus 10 according to the present embodiment is described.

The process of steps S171 to S179 is the same as the process of steps S131 to S139 illustrated in FIG. 14 described above.

In step S180, the vector information generation unit 13 sends the dictionary vector and the input vector to the similarity calculation unit 14 together with the similarity calculation request for each generated input vector. In response to receiving the similarity calculation request from the vector information generation unit 13, the similarity calculation unit 14 calculates the similarity between the dictionary vector and the input vector in step S181. In step S182, the similarity calculation unit 14 returns the calculated similarity as a calculation result to the vector information generation unit 13. The process of steps S180 to S182 is repeated by the number of divisions in step S177.

In step S183, the vector information generation unit 13 sends to the integration determination unit 16 the integration determination request and the similarity calculated by the similarity calculation unit 14 for the input vector corresponding to each of the divided log portions.

In response to receiving the integration determination request, the integration determination unit 16 performs integration determination on the similarity calculated by the similarity calculation unit 14 as weak discriminators and derives the determination result as a strong discriminator in step S184. In step S185, the integration determination unit 16 returns the determination result of the integration determination to the vector information generation unit 13.

The accuracy of identification is improved by calculating the similarity for the input vector of each log portion obtained by dividing the debug log and integrating and determining the similarity.

Figure 17:
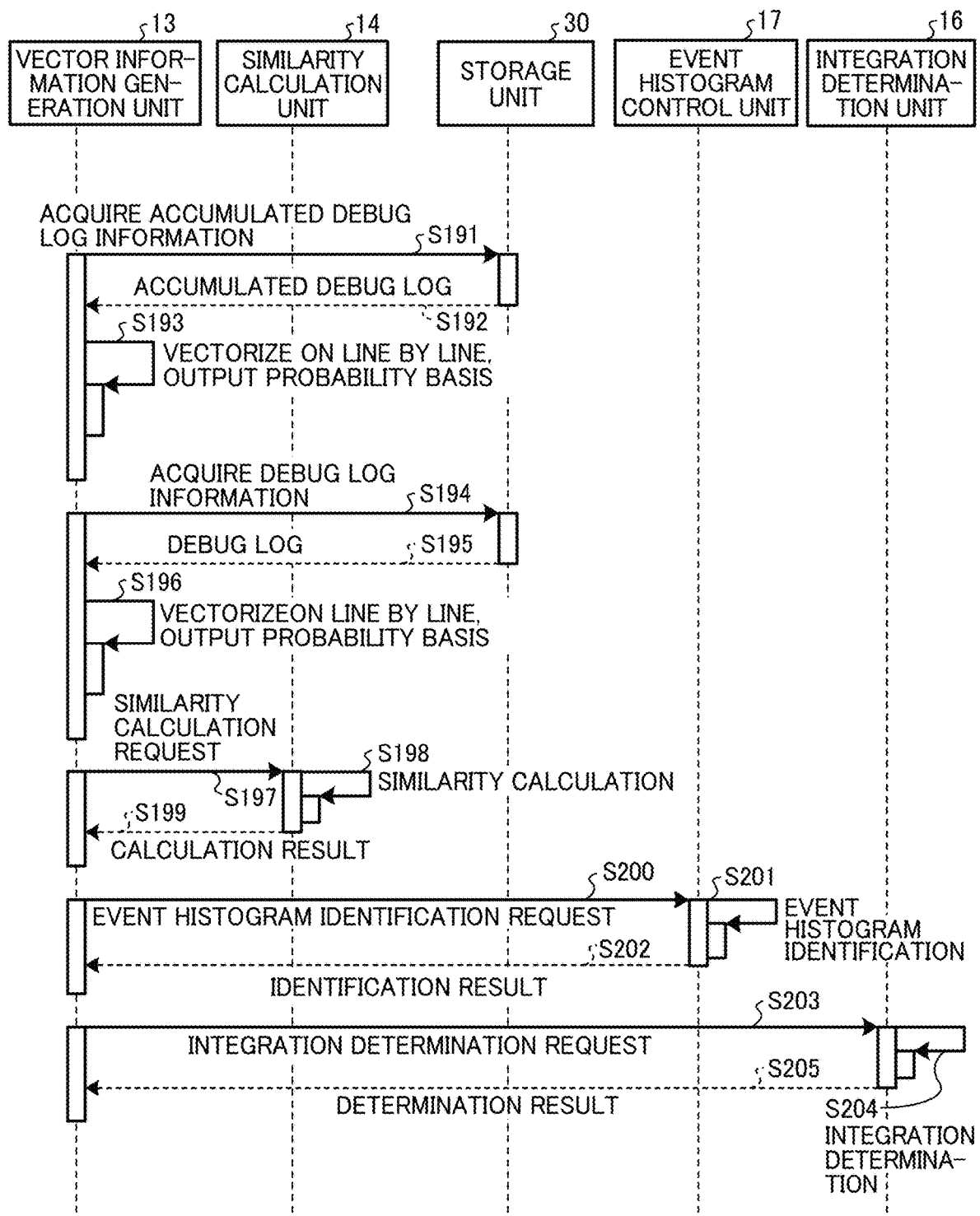
FIG. 17 is a sequence diagram illustrating an example of the debug log similarity calculation process that involves integration determination of an event histogram in the information processing apparatus according to embodiments of the present disclosure.

FIG. 17 is a sequence diagram illustrating an example of the debug log similarity calculation process that involves integration determination of an event histogram in the information processing apparatus according to the present embodiment. With reference to FIG. 17, the debug log similarity calculation process that involves integration determination of the event histogram by the information processing apparatus 10 according to the present embodiment is described.

The process of steps S191 to S199 is the same as the process of steps S11 to S19 illustrated in FIG. 9 described above.

In step S200, the vector information generation unit 13 sends an event histogram identification request to the event histogram control unit 17 together with the debug log acquired by the log information acquisition unit 12.

In response to receiving the event histogram identification request, the event histogram control unit 17 creates a histogram from the number of output lines per unit time of the debug log acquired by the log information acquisition unit 12 in step S201. Next, the event histogram control unit 17 performs classification by comparing the created histogram with a previously created histogram as dictionary data. In step S202, the event histogram control unit 17 returns the classification result to the vector information generation unit 13.

In step S203, the vector information generation unit 13 sends the integration determination request, the similarity calculated by the similarity calculation unit 14, and the identification result by the event histogram control unit 17 to the integration determination unit 16.

In response to receiving the integrated determination request, the integration determination unit 16 performs the integration determination with the similarity calculated by the similarity calculation unit 14 and the identification result by the event histogram control unit 17 as weak discriminators, and the determination result is derived as a strong discriminator in step S204. In step S205, the integration determination unit 16 returns the determination result of the integration determination to the vector information generation unit 13.

The accuracy of identification is improved by performing integration determination using data other than the debug log such as the histogram.

Figure 18:
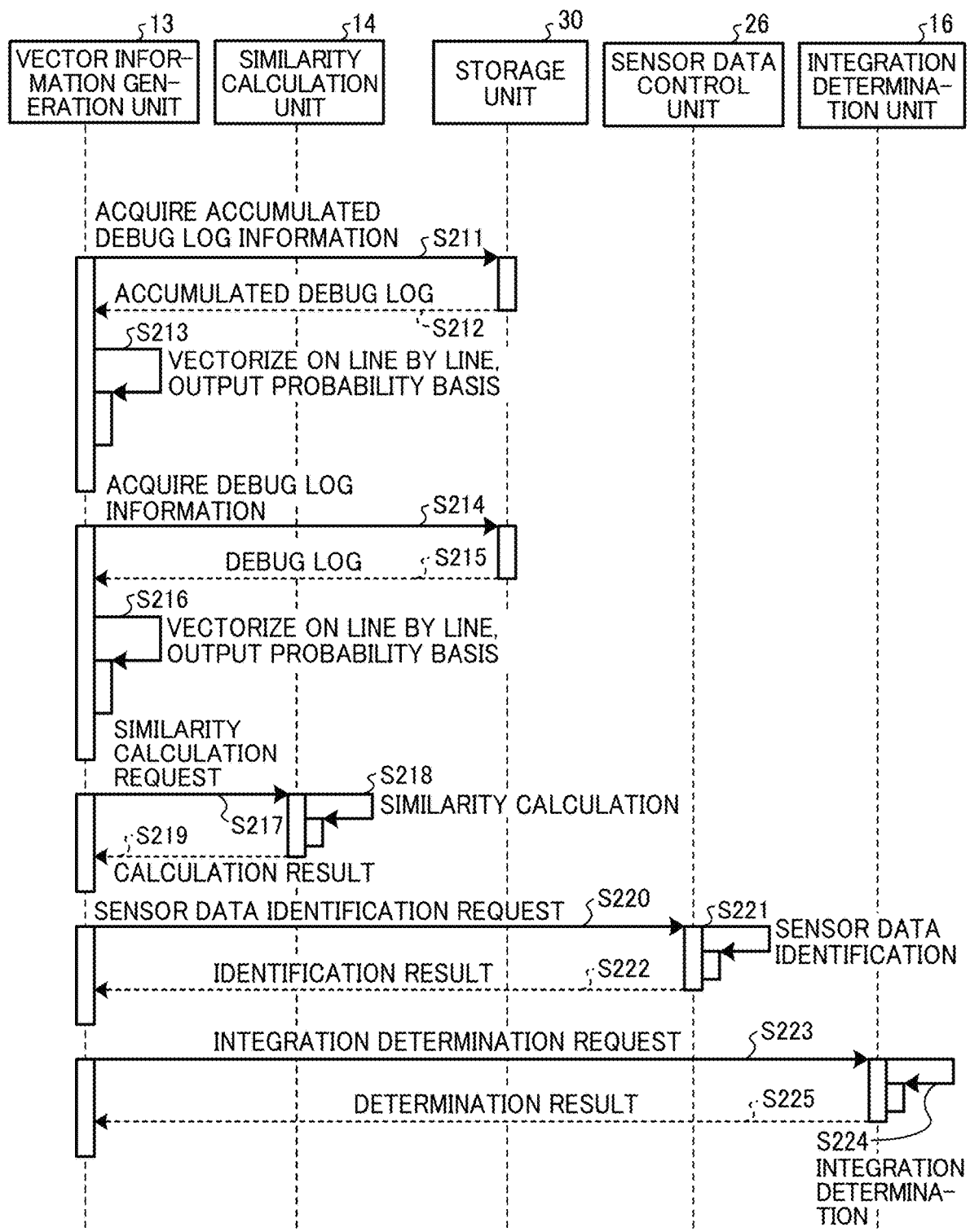
FIG. 18 is a sequence diagram illustrating an example of the debug log similarity calculation process that involves integration determination of sensor data in the information processing apparatus according to embodiments of the present disclosure.

FIG. 18 is a sequence diagram illustrating an example of the debug log similarity calculation process that involves integration determination of sensor data in the information processing apparatus according to the present embodiment. With reference to FIG. 18, the debug log similarity calculation process involving integration determination of sensor data by the information processing apparatus 10 according to the present embodiment is described.

The process of steps S211 to S219 is the same as the process of steps S11 to S19 illustrated in FIG. 9 described above.

In step S220, the vector information generation unit 13 sends an identification request based on sensor data to the sensor data control unit 26.

In response to receiving the identification request based on the sensor data, the sensor data control unit 26 calculates the degree of similarity by using the sensor data acquired by the sensor data acquisition unit 25 in step S221. For example, the sensor data control unit 26 reads the sensor data stored in the storage unit 30 in advance as dictionary data and calculates the degree of similarity with the sensor data acquired by the sensor data acquisition unit 25. In step S222, the sensor data control unit 26 returns the calculated similarity as the identification result to the vector information generation unit 13.

In step S223, the vector information generation unit 13 sends the integration determination request, the similarity calculated by the similarity calculation unit 14, and the similarity calculated by the sensor data control unit 26 to the integration determination unit 16.

In response to receiving the integrated determination request, the integration determination unit 16 perform integration determination with the similarity calculated by the similarity calculation unit 14 and the similarity calculated by the sensor data control unit 26 as weak discriminators, and a determination result is derived as a strong discriminator in step S224. In step S225, the integration determination unit 16 returns the determination result of the integration determination to the vector information generation unit 13.

The accuracy of identification is improved by performing integration determination using data other than the debug log such as sensor data.

Figure 19:
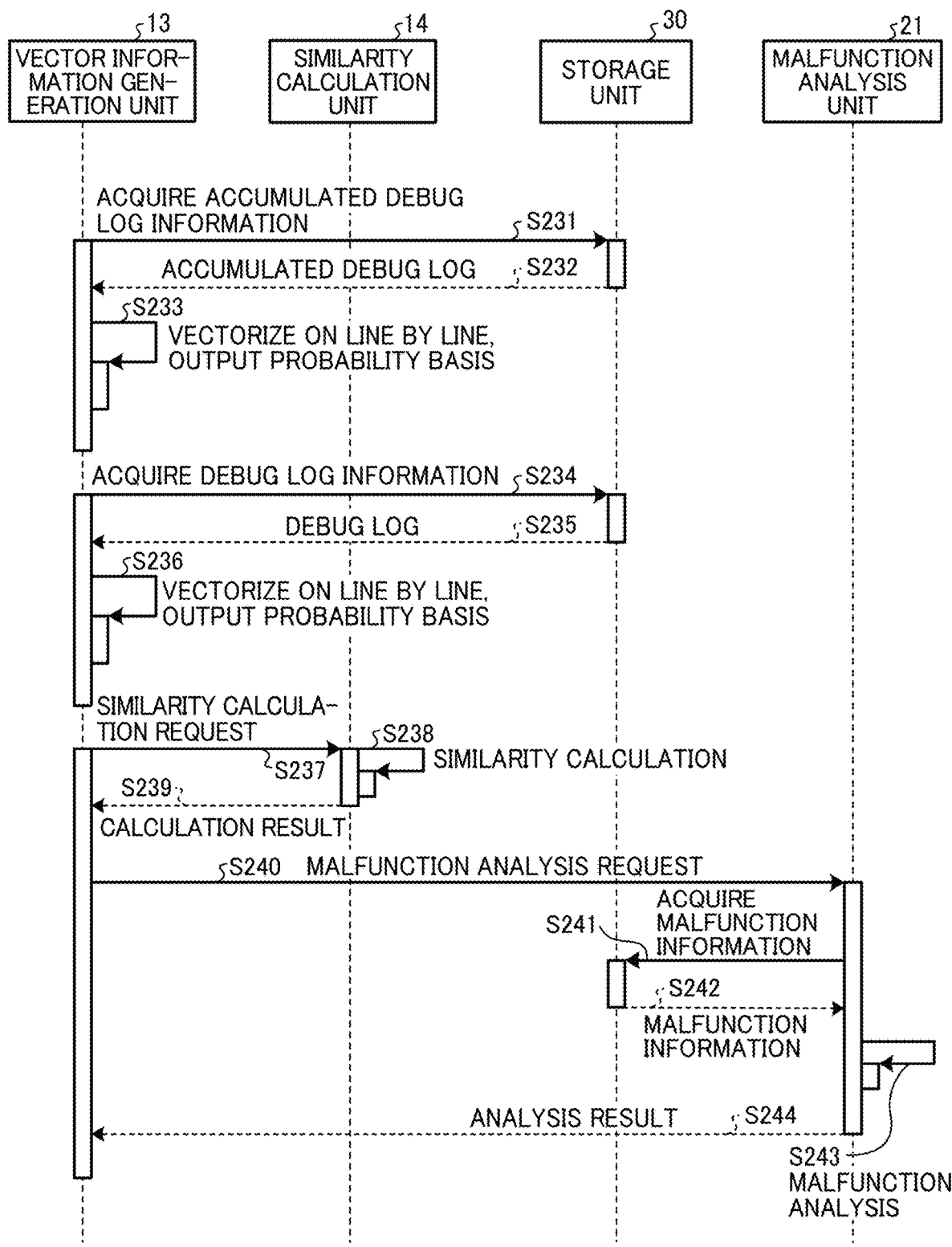
FIG. 19 is a sequence diagram illustrating an example of the debug log similarity calculation process involving a malfunction analysis in the information processing apparatus according to embodiments of the present disclosure.

FIG. 19 is a sequence diagram illustrating an example of the debug log similarity calculation process involving a malfunction analysis in the information processing apparatus according to the present embodiment. With reference to FIG. 19, the debug log similarity calculation process involving the failure analysis by the information processing apparatus 10 according to the present embodiment is described.

The process of steps S231 to S239 is the same as the process of steps S11 to S19 illustrated in FIG. 9 described above.

In step S240, the vector information generation unit 13 sends the similarity calculated by the similarity calculation unit 14 to the malfunction analysis unit 21 together with the malfunction analysis request.

In response to receiving the malfunction analysis request, the malfunction analysis unit 21 reads and acquires past malfunction information from the storage unit 30 in steps S241 and S242.

When the malfunction analysis unit 21 determines that the similarity calculated by the similarity calculation unit 14 is the same as the past malfunction information, and when malfunction indicated by the malfunction information occurs, similar analysis process (malfunction analysis process) is also performed on the identification result in step S243. In step S244, the malfunction analysis unit 21 returns the result of the malfunction analysis process to the vector information generation unit 13.

When a similar malfunction as in the past occurs, it is possible to automatically perform processing according to the malfunction.

Figure 20:
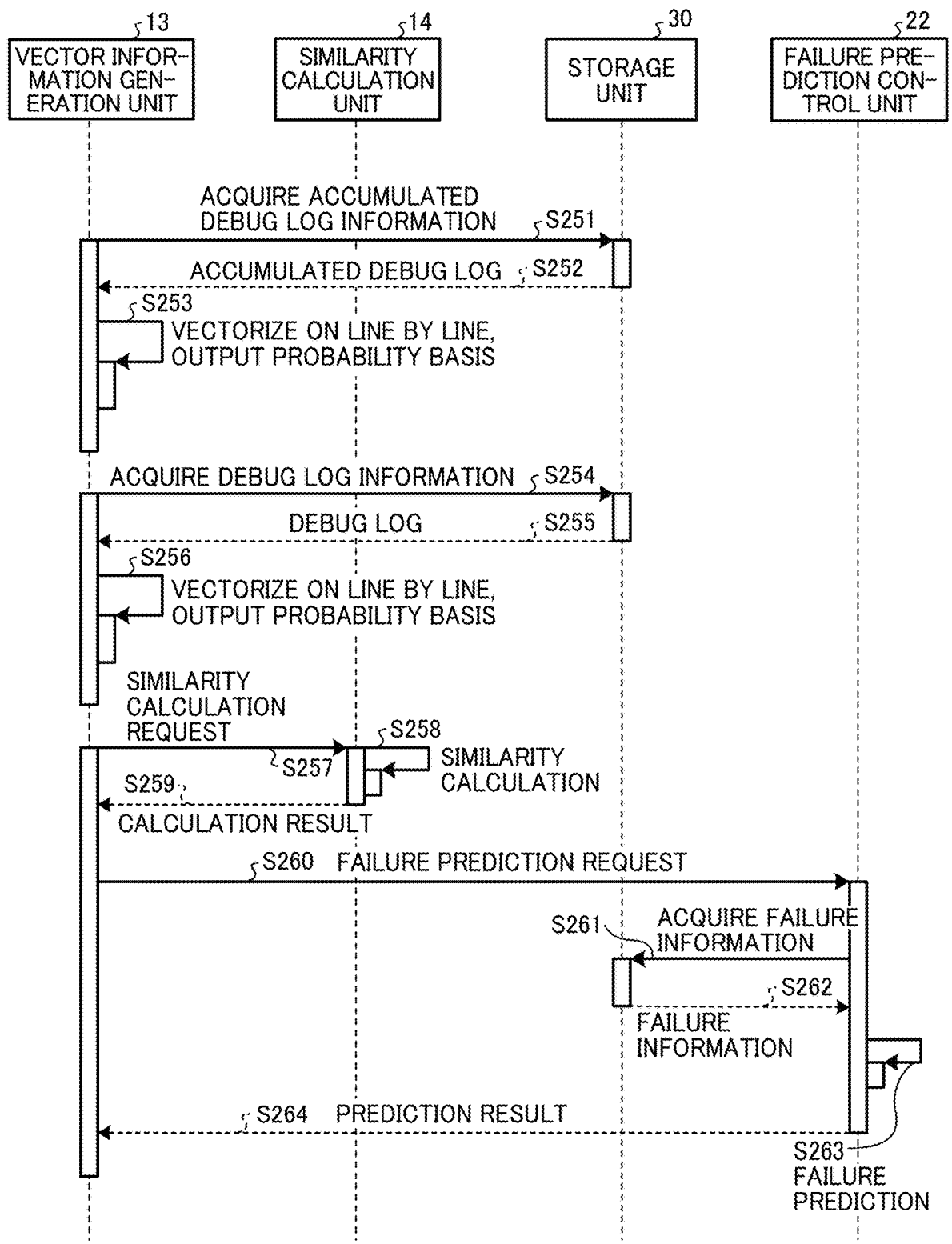
FIG. 20 is a sequence diagram illustrating an example of the debug log similarity calculation process that involves a failure prediction process in the information processing apparatus according to embodiments of the present disclosure.

FIG. 20 is a sequence diagram illustrating an example of the debug log similarity calculation process that involves a failure prediction process in the information processing apparatus according to the present embodiment. With reference to FIG. 20, the debug log similarity calculation process involving the failure prediction process by the information processing apparatus 10 according to the present embodiment is described.

The process of steps S251 to S259 is the same as the process of steps S11 to S19 illustrated in FIG. 9 described above.

The vector information generation unit 13 sends the failure prediction request and the similarity calculated by the similarity calculation unit 14 to the failure prediction control unit 22 in step S260.

In response to receiving the failure prediction request, the failure prediction control unit 22 reads and acquires past failure information from the storage unit 30 in steps S261 and S262.

In step S263, when the failure prediction control unit 22 determines that the similarity calculated by the similarity calculation unit 14 is the same as the past failure information, the failure prediction control unit 22 predicts the occurrence of a failure, and ordering of necessary replacement parts and the like (failure prediction process) is automatically executed according to the prediction result. In step S264, the failure prediction control unit 22 returns the prediction result of the failure prediction process to the vector information generation unit 13.

As described above, when similar failure occurred in the past is predicted, ordering of necessary replacement parts and the like can be automatically arranged.

Figure 21:
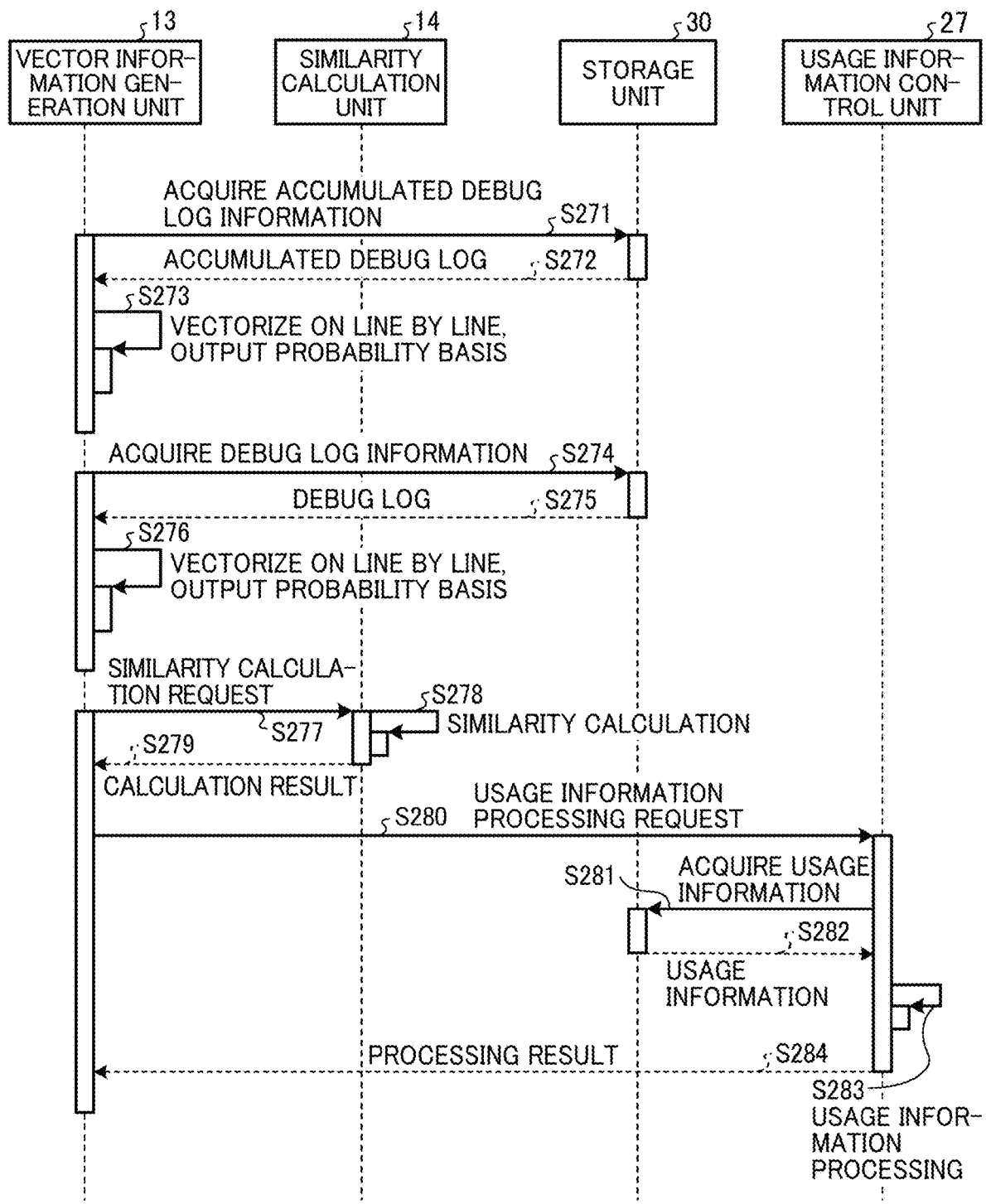
FIG. 21 is a sequence diagram illustrating an example of the debug log similarity calculation process involving a usage information process in the information processing apparatus according to embodiments of the present disclosure.

FIG. 21 is a sequence diagram illustrating an example of the debug log similarity calculation process involving a usage information process in the information processing apparatus according to the present embodiment. With reference to FIG. 21, the debug log similarity calculation process involving the usage information process by the information processing apparatus 10 according to the present embodiment is described.

The process of steps S271 to S279 is the same as the process of steps S11 to S19 illustrated in FIG. 9 described above.

The vector information generation unit 13 sends the usage information processing request and the similarity calculated by the similarity calculation unit 14 to the usage information control unit 27 in step S280.

In response to receiving the usage information processing request, the usage information control unit 27 reads and acquires the usage information from the storage unit 30 in steps S281 and S282.

In step S283, when the usage information control unit 27 determines that the similarity calculated by the similarity calculation unit 14 is the same as the read usage information, the usage information control unit 27 identifies a recommended application or function indicated by the usage information and usage information processing such as presentation of the identified information is performed. In step S284, the usage information control unit 27 returns the processing result of the usage information processing to the vector information generation unit 13.

Thus, as the usage information processing, for example, the recommended application or function indicated by the usage information is displayed on the display 108, or measures such as sending to an email address for marketing use can be made.

Figure 22:
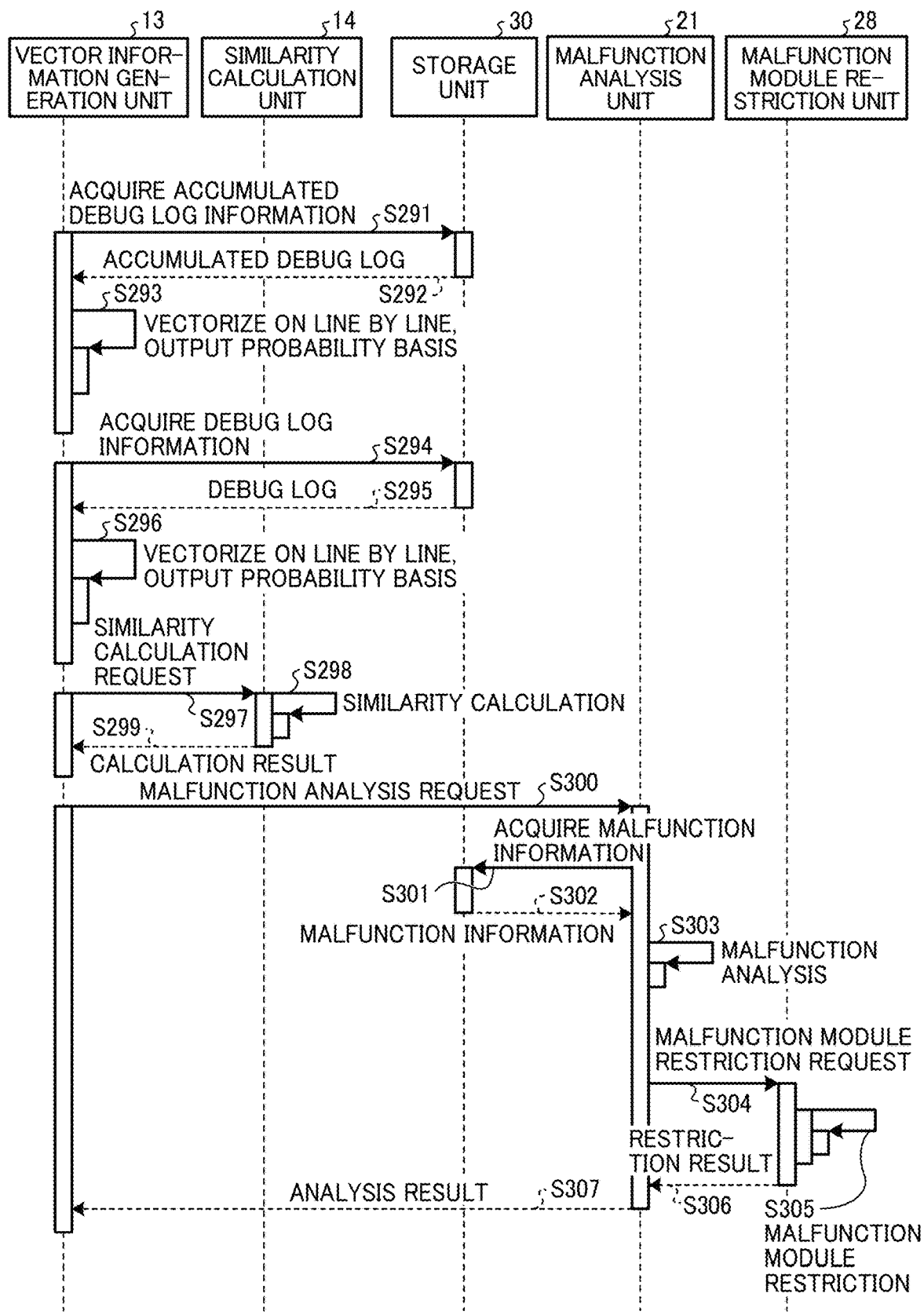
FIG. 22 is a sequence diagram illustrating an example of the debug log similarity calculation process that involves restricting defective modules in the information processing apparatus according to embodiments of the present disclosure.

FIG. 22 is a sequence diagram illustrating an example of the debug log similarity calculation process that involves restriction of a defective module in the information processing apparatus according to the present embodiment. With reference to FIG. 22, the debug log similarity calculation process involving restriction of the defective module by the information processing apparatus 10 according to the present embodiment is described.

The process of steps S291 to S303 is the same as the process of steps S231 to S243 illustrated in FIG. 19.

When the malfunction analysis unit 21 determines that the similarity calculated by the similarity calculation unit 14 is the same as the previous malfunction information, the malfunction analysis unit 21 sends the defective module restriction request together with the information identifying the module corresponding to the similarity to the malfunction module restriction unit 28 in step S304.

In response to receiving the malfunction module restriction request, the malfunction module restriction unit 28 restricts or stops the operation of the module identified by the information of the module corresponding to the similarity in step S305. In step S306, the malfunction module restriction unit 28 returns the result (restriction or stop of the operation of the malfunction module) to the malfunction analysis unit 21.

In step S307, the malfunction analysis unit 21 returns the result of the malfunction analysis process to the vector information generation unit 13.

As a result, downtime can be reduced by identifying the module in which the malfunction has occurred and restricting or stopping the operation of the module.

Figure 23:
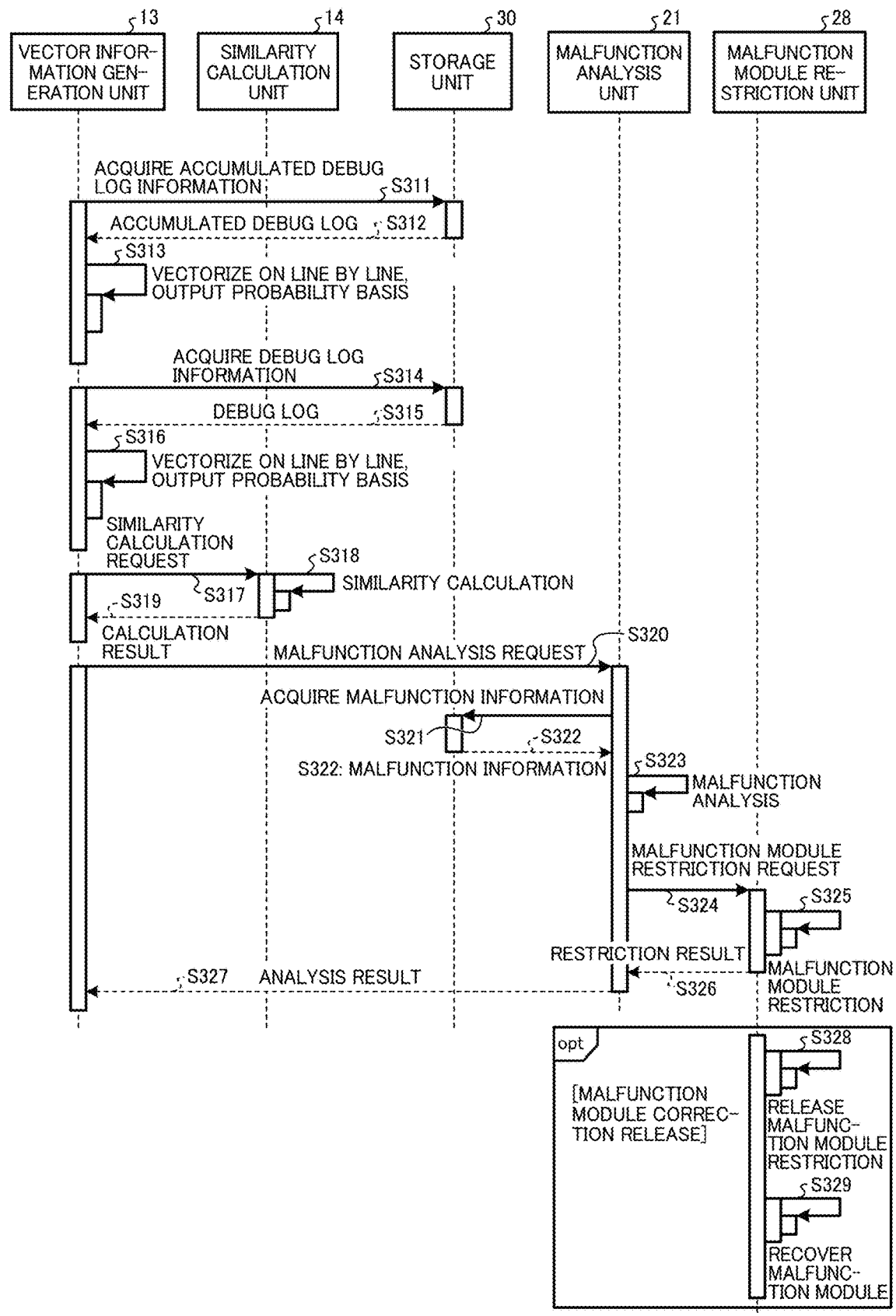
FIG. 23 is a sequence diagram illustrating an example of the debug log similarity calculation process that involves restoration of a defective module in the information processing apparatus according to embodiments of the present disclosure.

FIG. 23 is a sequence diagram illustrating an example of the debug log similarity calculation process that involves restoration of a defective module in the information processing apparatus according to the present embodiment. With reference to FIG. 23, the debug log similarity calculation process involving restoration of the defective module by the information processing apparatus 10 according to the present embodiment is described.

The process of steps S311 to S327 is the same as the process of steps S291 to S307 illustrated in FIG. 22 described above.

When a version of software including countermeasure for a defect is available for the defective module, the malfunction module restriction unit 28 releases the state in which operation of the defective module is restricted or stopped in step S328 and updates the software with the countermeasure version in step S329.

In this way, when the countermeasure version for the defect of the module whose operation is restricted or stopped is released, it becomes possible to automatically recover with the countermeasure version.

As described above, in the malfunction monitoring system 1 according to the present embodiment, it is possible to perform calculation between debug logs by generating a distributed representation vector for each line from the debug log, and automatically analyze malfunctions that are considered to be defective only by a specific combination or order of debug logs.

In the operation of the vector information generation unit 13 described in each of the above sequence diagrams, the vector of the distributed representation is generated for each line of the debug log and the process using the vector is described, but the present invention is not limited to this.

Alternatively, a vector of a distributed representation for the entire debug log may be generated and the vector may be processed.

Further, the operations of the above sequence diagrams can be implemented by appropriately combining the operation.

Each of the functions of the above-described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

Further, the program executed by the information processing apparatus 10 of the above-described embodiment is a file in an installable format or an executable format and may be recorded and provided as a computer program product in a computer-readable recording medium such as a Compact Disc Read Only Memory (CD-ROM), a flexible disk (FD), a Compact Disk-Recordable (CD-R), a Digital Versatile Disk (DVD), and the like.

In addition, the program executed by the information processing apparatus 10 according to the above-described embodiment may be stored in a computer connected to a network such as the internet and provided by being downloaded through the network. Further, the program executed by the information processing apparatus 10 of the above-described embodiment may be provided or distributed through a network such as the internet.

Further, the program executed by the information processing apparatus 10 of the above-described embodiment has a module configuration including the above-described functional units, and in actual hardware, a CPU (processor) reads the program from the above-mentioned ROM. By executing the above, the above-mentioned respective parts are loaded onto the main memory, and the respective parts are generated on the main memory.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

What is claimed is:

1. An information processing apparatus comprising: circuitry configured to,
acquire an operation log of a target device over a network, the target device being a machine tool connected to the information processing apparatus via the network, the target device including a plurality of modules therein,
generate a first vector of a distributed representation indicating the operation log such that, for each line of the operation log, the first vector is multi-dimensional vector uniquely representing a respective one of the lines of the operation log,
calculate similarity the first vector and a second vector of a distributed representation based on another operation log to identify the first vector,
detect that the target device includes a defective module in response to a determination that an identification result of the first vector matches past defect information, and
disable operation of the defective module of the target device.

2. The information processing apparatus of claim 1, wherein the circuitry is further configured to:
learn an embedded matrix that predicts surrounding lines from each line of the operation log; and
generate the first vector based on the embedded matrix.

3. The information processing apparatus of claim 1, wherein the circuitry is further configured to:
apply preprocessing to the operation log that is acquired, the preprocessing contributing to generation of the first vector of the distributed representation from the operation log; and
generate the first vector from the operation log having been applied with the preprocessing.

4. The information processing apparatus of claim 1, wherein the circuitry is further configured to
calculate similarity between the first vector, and the second vector prepared based on dictionary data.

5. The information processing apparatus of claim 4, wherein the circuitry is further configured to
display on a display, the identification result of the first vector,
wherein, when the similarity is greater than a first threshold, the circuitry displays on the display the similarity as the identification result, and
when the similarity is no greater than the first threshold and is greater than a second threshold, the circuitry identifies sub-classification using fixed logic corresponding to each classification of the similarity, and displays the identified sub-classification as the identification result.

6. The information processing apparatus of claim 4, wherein the circuitry is further configured to
calculate the similarity between the first vector, and the second vector that is based on the dictionary data and stored in an external device.

7. The information processing apparatus of claim 1, wherein the circuitry is further configured to
accumulate the operation log as the dictionary data after identifying the first vector.

8. The information processing apparatus of claim 4, wherein the circuitry is further configured to:
divide the operation log into a plurality of log portions according to a state of the operation log; and
generate the first vector for each log portion.

9. The information processing apparatus of claim 8, wherein the circuitry is further configured to:
set division condition of the operation log; and
divide the operation log according to the division condition.

10. The information processing apparatus of claim 8, wherein the circuitry is further configured to:
perform identification sequentially on each log portion of the first vector; and
cancel the identification on the first vector when the similarity between the first vector and the second vector is larger than a third threshold.

11. The information processing apparatus of claim 8, wherein the circuitry is further configured to
integrate weak discriminators each being an identification result of the log portion of the first vector, into an integrated weak discriminator, and perform identification on the integrated weak discriminator.

12. The information processing apparatus of claim 1, wherein the circuitry is further configured to:
acquire the operation log for each of a plurality of modules;
generate the first vector for the operation log corresponding to each module;
perform identification on the first vector of each module; and
perform identification on an integrated weak discriminator, the integrated weak discriminator being generated by integrating weak discriminators each being the identification result of the first vector of each module.

13. The information processing apparatus of claim 1, wherein the circuitry is further configured to
perform identification on an integrated weak discriminator, the integrated weak discriminator being generated by integrating weak discriminators each being the identification result of the first vector and data other than the operation log.

14. The information processing apparatus of claim 1, wherein the circuitry is further configured to
when software that solves the defect is available, update software of the defective module with the software that solves the defect.

15. The information processing apparatus of claim 1, wherein the circuitry is further configured to
determine whether the identification result matches past failure information, and
automatically issues an order of replacement parts according to the past failure information when the identification result matches the past failure information.

16. A method comprising;
acquiring an operation log of a target device over a network, the target device being a machine tool connected to the information processing apparatus via the network, the target device including a plurality of modules therein;
generating a first vector of a distributed representation indicating the acquired operation log such that, for each line of the operation log, the first vector is multi-dimensional vector uniquely representing a respective one of the lines of the operation log;
identifying the first vector based on a calculation of the first vector and a second vector of a distributed representation based on another operation log;
detecting that the target device includes a defective module in response to a determination that an identification result of the first vector matches past defect information; and
disabling operation of the defective module of the target device.

17. A non-transitory recording medium storing a plurality of instructions which, when executed by one or more processors, causes the processors to perform a method comprising:
acquiring an operation log of a target device over a network, the target device being a machine tool connected to the information processing apparatus via the network, the target device including a plurality of modules therein;
generating a first vector of a distributed representation indicating the acquired operation log such that, for each line of the operation log, the first vector is multi-dimensional vector uniquely representing a respective one of the lines of the operation log; and
identifying the first vector based on a calculation of the first vector and a second vector of a distributed representation based on another operation log;
detecting that the target device includes a defective module in response to a determination that an identification result of the first vector matches past defect information; and
disabling operation of the defective module of the target device.

* * * * *